US012207289B2

(12) United States Patent
Huang et al.

(10) Patent No.: US 12,207,289 B2
(45) Date of Patent: Jan. 21, 2025

(54) DOWNLINK BEAM DETERMINATION IN WIRELESS COMMUNICATION SYSTEM WITH FULL-DUPLEX

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 17/632,754

(22) PCT Filed: Aug. 26, 2019

(86) PCT No.: PCT/CN2019/102494
§ 371 (c)(1),
(2) Date: Feb. 3, 2022

(87) PCT Pub. No.: WO2021/035461
PCT Pub. Date: Mar. 4, 2021

(65) Prior Publication Data
US 2022/0295503 A1  Sep. 15, 2022

(51) Int. Cl.
*H04W 72/56*  (2023.01)
*H04L 5/14*  (2006.01)
(Continued)

(52) U.S. Cl.
CPC .............. *H04W 72/56* (2023.01); *H04L 5/14* (2013.01); *H04W 72/0446* (2013.01);
(Continued)

(58) Field of Classification Search
CPC ............ H04W 16/28; H04W 72/0446; H04W 88/14; H04W 88/04; H04W 88/10;
(Continued)

(56) References Cited

U.S. PATENT DOCUMENTS 11,206,549 B1 * 12/2021 Eyuboglu ......... H04W 72/1273
2019/0132847 A1  5/2019 Abedini et al.

FOREIGN PATENT DOCUMENTS

| CN | 108934030 A | 12/2018 |
| CN | 109275177 A | 1/2019 |
| WO | 2019144841 A1 | 8/2019 |

OTHER PUBLICATIONS

Cewit: "Discussions on Resource Multiplexing Among Backhaul and Access Links", 3GPP TSG RAN WG1 #96bis, R1-1905210, 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019 Apr. 7, 2019, XP051700285, 11 Pages, paragraphs [0003]—[0004], figure 1.

(Continued)

*Primary Examiner* — Tu X Nguyen
(74) *Attorney, Agent, or Firm* — Muncy, Geissler, Olds & Low, P.C.

(57) ABSTRACT

Disclosed are techniques related to wireless communication system to enable full duplex communication. A network node may include a transceiver, a memory, and a processor communicatively coupled to the transceiver and the memory. The transceiver, memory, and processor may be configured to determine downlink (DL) parent and child link priorities for parent and child time-domain resources that overlap in time at least partially. The transceiver, memory, and processor may also be configured to determine DL parent and child beams based on the DL parent and child link priorities. The transceiver, memory, and processor may further be configured to notify the parent node of the DL parent beam for the parent and child time-domain resources. The transceiver, memory, and processor may yet further be configured to concurrently receive parent traffic from the (Continued)

parent node using the DL parent beam and transmit child traffic to the child node using the DL child beam.

42 Claims, 12 Drawing Sheets

(51) Int. Cl.
    *H04W 72/044*    (2023.01)
    *H04W 72/0446*   (2023.01)
    *H04W 72/23*     (2023.01)
    *H04W 72/541*    (2023.01)
    *H04W 88/08*     (2009.01)

(52) U.S. Cl.
    CPC ......... *H04W 72/046* (2013.01); *H04W 72/23* (2023.01); *H04W 72/541* (2023.01); *H04W 88/08* (2013.01)

(58) Field of Classification Search
    CPC ..... H04W 92/20; H04W 84/10; H04W 74/02; H04W 72/56; H04W 36/04; H04W 84/20; H04W 52/46; H04W 92/16
    See application file for complete search history.

(56) References Cited

OTHER PUBLICATIONS

Samsung: "Resource Multiplexing Between Backhaul and Access Links", 3GPP TSG RAN WG1 #96, R1-1902271 IAB Resource Multiplexing_Final, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019, XP051599966, 7 Pages, paragraphs [0002]—[0003], figure 1.

Supplementary European Search Report—EP19943203—Search Authority—Munich—Apr. 28, 2023.

AT&T: "Summary of 7.2.3.1 Enhancements to Support NR Backhaul Links", 3GPP TSG RAN WG1 Meeting #95, R1-1814127, Spokane, USA, Nov. 16, 2018 (Nov. 16, 2018), 25 pages, Nov. 12, 2018-Nov. 16, 2018, the whole document.

International Search Report and Written Opinion—PCT/CN2019/102494—ISA/EPO—Jun. 2, 2020.

Qualcomm Incorporated, "Enhancements to Support NR Backhaul Links", 3GPP TSG RAN WG1 Meeting #95, R1-1813417, Spokane, USA, Nov. 16, 2018 (Nov. 16, 2018), 23 pages, Nov. 12, 2018-Nov. 16, 2018, sections 2-9.

* cited by examiner

DOWNLINK BEAM DETERMINATION IN WIRELESS COMMUNICATION SYSTEM WITH FULL-DUPLEX

CROSS-REFERENCE TO RELATED APPLICATION

The present application claims priority to International Application No. PCT/CN2019/102494, filed Aug. 26, 2019, which is herein incorporated by reference in its entirety.

TECHNICAL FIELD

Various aspects described herein generally relate to wireless communication systems, and more particularly, to downlink beam determination in wireless communication systems with full-duplex (FD).

BACKGROUND

Wireless communication systems have developed through various generations, including a 1G (first-generation) analog wireless phone service, a 2G (second-generation) digital wireless phone service (including interim 2.5G and 2.75G networks), a 3G (third-generation) high speed data, Internet-capable wireless service and a 4G (fourth-generation) service (e.g., Long Term Evolution (LTE) or WiMax). There are presently many different types of wireless communication systems in use, including Cellular and PCS (Personal Communications Service) systems. Examples of known cellular systems include the cellular AMPS (Analog Advanced Mobile Phone System), and digital cellular systems based on CDMA (Code Division Multiple Access), FDMA (Frequency Division Multiple Access), TDMA (Time Division Multiple Access), GSM (Global System for Mobile access) variation of TDMA, etc.

A 5G (fifth generation) mobile standard calls for higher data transfer speeds, greater numbers of connections, and better coverage, among other improvements. The 5G standard (also referred to as NR (New Radio)), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One or more aspects may be directed to a method of a network node configured to communicate with a parent node and a child node. The method may comprise determining downlink (DL) parent and child link priorities for parent and child time-domain resources that overlap in time at least partially. The method may also comprise determining DL parent and child beams based on the DL parent and child link priorities. The method may further comprise notifying the parent node of the DL parent beam for the parent and child time-domain resources. The method may yet further comprise concurrently receiving parent traffic from the parent node using the DL parent beam and transmitting child traffic to the child node using the DL child beam.

One or more aspects may be directed to a network node configured to communicate with a parent node and a child node. The network node may comprise a transceiver, a memory, and a processor communicatively coupled to the transceiver and the memory. The transceiver, memory, and processor may be configured to determine downlink (DL) parent and child link priorities for parent and child time-domain resources that overlap in time at least partially. The transceiver, memory, and processor may also be configured to determine DL parent and child beams based on the DL parent and child link priorities. The transceiver, memory, and processor may further be configured to notify the parent node of the DL parent beam for the parent and child time-domain resources. The transceiver, memory, and processor may yet further be configured to concurrently receive parent traffic from the parent node using the DL parent beam and transmit child traffic to the child node using the DL child beam.

One or more aspects may be directed to a network node for communicating with a parent node and a child node. The network node may comprise means for determining downlink (DL) parent and child link priorities for parent and child time-domain resources that overlap in time at least partially. The network node may also comprise means for determining DL parent and child beams based on the DL parent and child link priorities. The network node may further comprise means for notifying the parent node of the DL parent beam for the parent and child time-domain resources. The network node may yet further comprise means for concurrently receiving parent traffic from the parent node using the DL parent beam and transmitting child traffic to the child node using the DL child beam.

One or more aspects may be directed to a non-transitory computer-readable medium storing computer-executable instructions for a network node to communicate with a parent node and a child node. The computer-executable instructions may comprise one or more instructions causing the network node to determine downlink (DL) parent and child link priorities for parent and child time-domain resources that overlap in time at least partially. The computer-executable instructions may also comprise one or more instructions causing the network node to one or more instructions causing the network node to determine DL parent and child beams based on the DL parent and child link priorities. The computer-executable instructions may further comprise one or more instructions causing the network node to notify the parent node of the DL parent beam for the parent and child time-domain resources. The computer-executable instructions may yet further comprise one or more instructions causing the network node to concurrently receive parent traffic from the parent node using the DL parent beam and transmit child traffic to the child node using the DL child beam.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
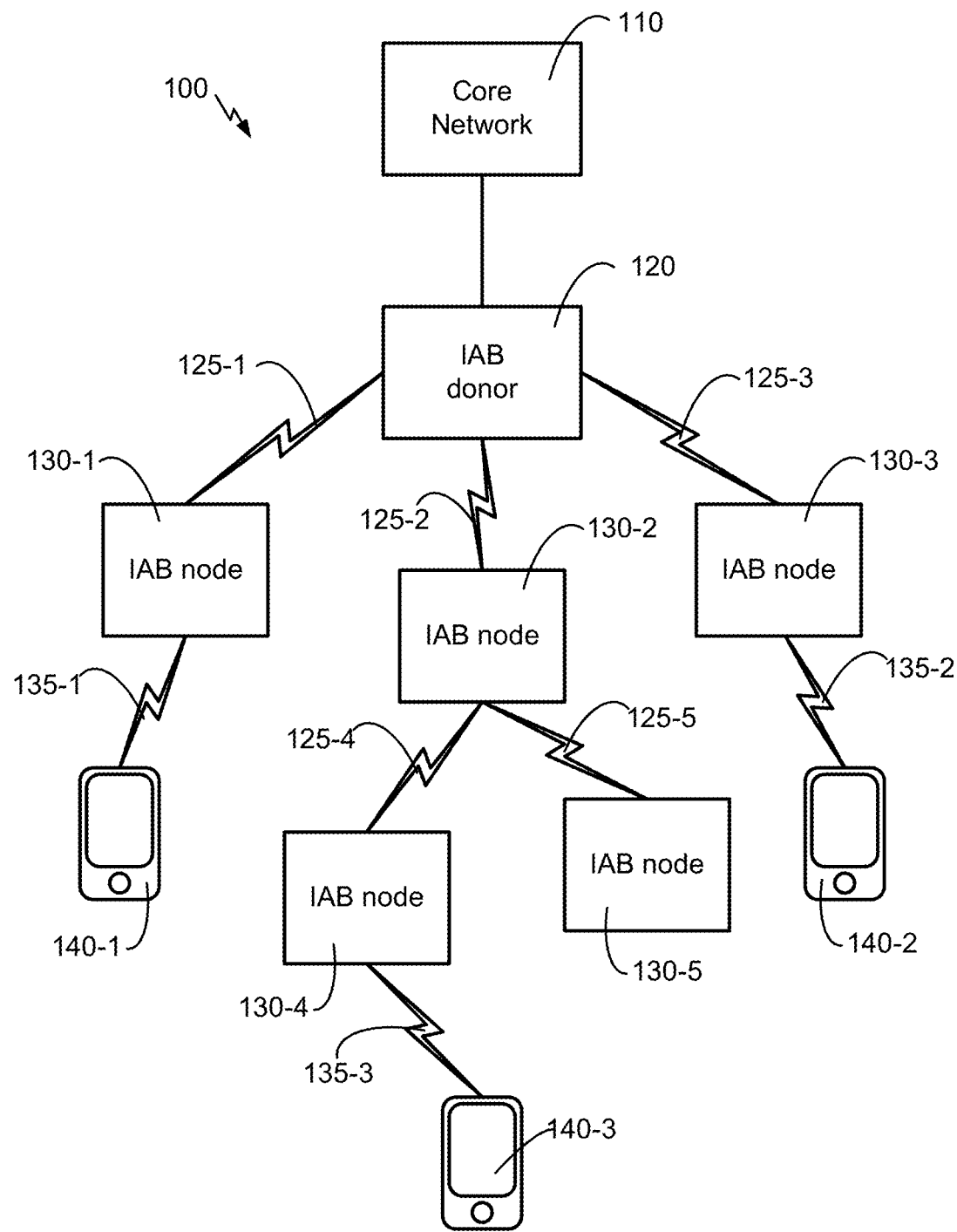
FIG. 1 illustrates a high-level system architecture of a wireless communications system, according to various aspects.

Various aspects described herein generally relate to wireless communication systems, and more particularly, to downlink beam determination in wireless communication systems with full-duplex. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., ASIC (application specific integrated circuit)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a CN (core network) via a RAN (radio access network), and through the core network the UEs can be connected with external networks such as the Internet and with other UEs. Of course, other mechanisms of connecting to the core network and/or the Internet are also possible for the UEs, such as over a wired access network, a WLAN (wireless local area network) (e.g., based on IEEE 802.11, etc.) and so on.

A base station may operate according to one of several RATs (radio access technology) in communication with UEs depending on the network in which it is deployed, and may be alternatively referred to as an Access Point (AP), a Network Node, a NodeB, an eNB or eNodeB (evolved NodeB), a gNB or gNodeB (general Node B), etc. In addition, in some systems a base station may provide purely edge node signaling functions while in other systems it may provide additional control and/or network management functions.

UEs can be embodied by any of a number of types of devices including but not limited to PC (printed circuit) cards, compact flash devices, external or internal modems, wireless or wireline phones, smartphones, tablets, tracking devices, asset tags, smart watches and other wearable devices, servers, routers, electronic devices implemented in vehicles (e.g., automobiles, bicycles, motorcycles, etc.) and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term TCH (traffic channel) can refer to either an uplink/reverse or downlink/forward traffic channel.

Next generation wireless networks such as 5G NR are expected to provide ultra-high data rate and support wide scope of application scenarios. Wireless full-duplex communications is an emerging technique and is theoretically capable of doubling the link capacity. The main idea behind wireless full-duplex is to enable radio network nodes to transmit and receive simultaneously at the same time slot. This contrasts with conventional half duplex operation where transmission and reception differs in time.

A full-duplex network node, such as a base station of a cellular network, can communicate simultaneously in UL (uplink) and DL (downlink) with two half-duplex terminals using the same radio resources. Another typical wireless full-duplex application scenario is that one relay node can communicate simultaneously with an anchor node and a UE in a one-hop scenario, or with two other relay nodes in a multi-hop scenario.

FIG. 1 illustrates a high-level system architecture of a wireless communications system 100 in accordance with one or more aspects of the disclosure. The wireless communications system 100 may include a core network 110, an IAB (integrated access backhaul) donor 120, IAB nodes 130-1, 130-2, 130-3, 130-4, 130-5 (collectively IAB nodes 130), and UEs 140-1, 140-2, 140-3 (collectively UEs 140). Although only one IAB donor 120, five (5) IAB nodes 130 and three UEs 140 are shown, the actual numbers of these devices can vary. The IAB nodes 130 may be examples of network nodes serving UEs 140 in a network.

In system 100, the UEs 140 and the IAB nodes 130 may be configured to communicate with each other over wireless access links 135. For example, as illustrated in FIG. 1, the UE 140-1 and the IAB node 130-1 may communicate over the access link 135-1, the UE 140-2 may communicate with the IAB node 130-3 over the access link 135-2, and the UE 140-3 may communicate with the IAB node 130-4 over the access link 135-3. In an aspect, each IAB nodes 130 may be a base station or a cell of a network (e.g., gNBs, gNodeBs, eNBs, eNodeBs, etc.) configured to serve one or more UEs 140 within its coverage area. Thus, in FIG. 1, the IAB nodes 130-1, 130-3, 130-4 may respectively be a serving cell of the UEs 140-1, 140-2, 140-3. The access links 135 may comply with a given cellular communications protocol (e.g., CDMA (Code Division Multiple Access)), E-VDO (Evolution-Data Optimized), eHRPD (Enhanced High Rate Packet Data), GSM (Global System for Mobile communications), W-CDMA (Wideband CDMA), LTE, LTE-U, 5G NR, etc.).

Each IAB node 130 may be configured to communicate with other IAB nodes 130 and/or the IAB donor over wireless backhaul links 125. For example, as illustrated in FIG. 1, the IAB nodes 130-1, 130-2, 130-3 may communicate with the IAB donor 120 respectively over backhaul links 130-1, 130-2, 130-3. Also, the IAB node 130-2 may communicate with the IAB node 130-4 over the backhaul link 125-4, and communicate with the IAB node 130-5 over the backhaul link 125-5.

It would be desirable to enable in-band FD (full-duplex) transmission, i.e., concurrently transmitting and receiving using same radio resources (e.g., in frequency and time). In-band FD can be enabled by canceling strong self-interference from transmission link to reception link. Current FD radio designs can suppress such self-interference by combining the technologies of beamforming, analog cancellation, digital cancellation and antenna cancellation.

If the transmit power is large, there may still exist a certain degree of remaining self-interference strength even after cancellation. This may impair the reception performance of received signal. In the process of cancellation, a certain part of the signal energy may leak to adjacent frequency bands, which can causes self-interference at these adjacent frequency bands.

Figure 2:
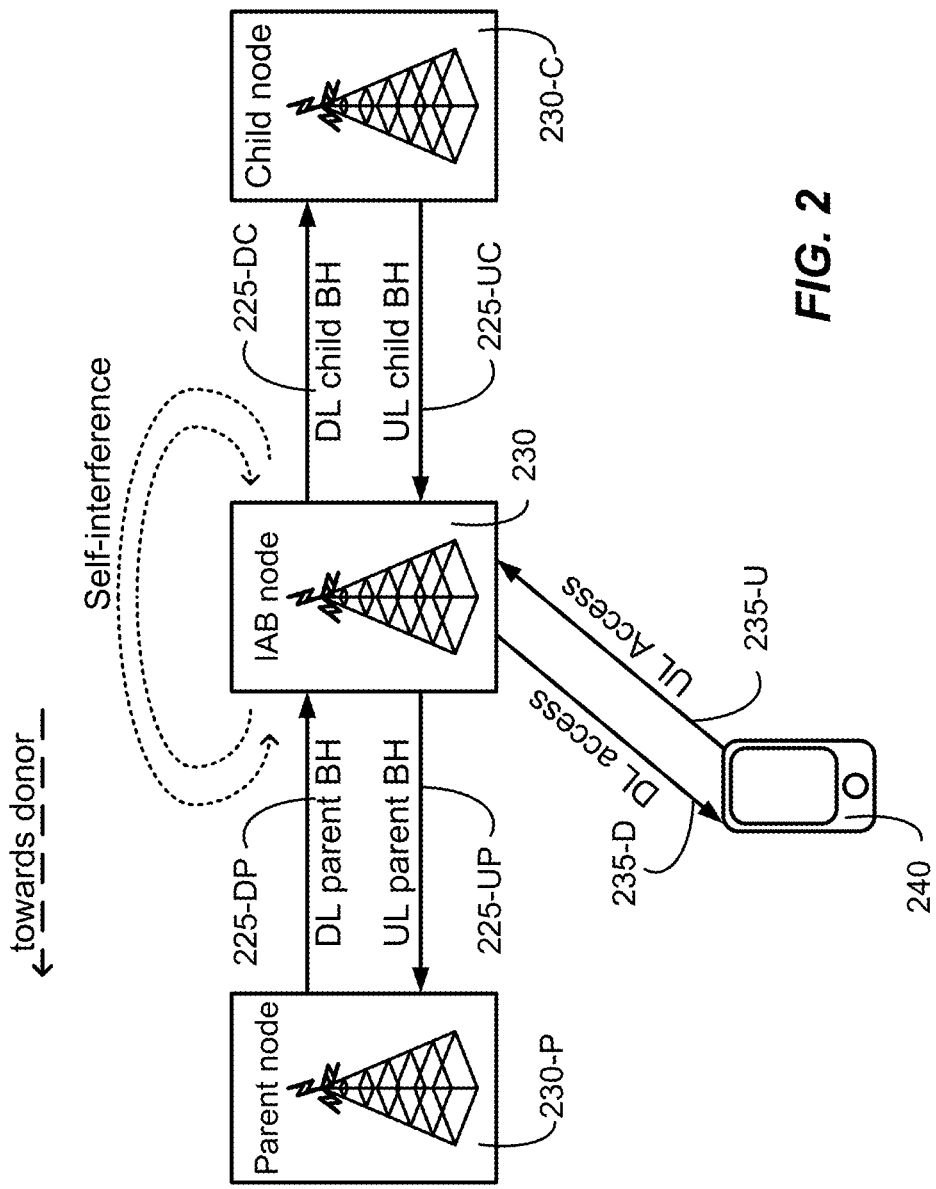
FIG. 2 illustrates a view of a wireless communication system involved in full-duplex communication, according to various aspects.

An IAB system may comprise an IAB donor 120, one or more IAB nodes 130, and one or more UEs 140. Thus, the wireless communication system 100 of FIG. 1 may be viewed as an example of an IAB system. FIG. 2 illustrates an example view of an IAB system from a perspective of a particular IAB node 230. In the IAB system, it may be assumed that the IAB node 230 is serving a UE 240. An IAB node closer to the IAB donor (not shown in FIG. 2) is a parent IAB node 230-P and an IAB node further from the IAB donor is a child IAB node 230-C.

The IAB node 230 may have six (6) kinds of communication links in which three (3) may be transmission links and three may be reception links:
Reception links:
  DL parent BH (backhaul) link 225-DP—to receive from the parent IAB node 230-P;
  UL child BH link 225-UC—to receive from the child IAB node 230-C;
  UL access link 235-U—to receive from the UE 240;
Transmission links:
  UL parent BH link 225-UP—to transmit to the parent IAB node 230-P;
  DL child BH link 225-DC—to transmit to the child IAB node 230-C;
  DL access link 235-D—to transmit to the UE 240.

The DL and UL parent BH links 225-DP, 225-UP and the DL and UL child BH links 225-DC, 225-UC may be analogous to the backhaul links 125 of FIG. 1. Also, the DL and UL access links 235-D, 235-C may be analogous to the access links 135 of FIG. 1.

In the IAB node 230 with full-duplex, a transmitted signal on any transmission link can cause self-interference to a received signal—in-band and/or in adjacent bands—on any reception link. When this interference strength is large enough (e.g. larger than thermal noise power), it can impair the reception performance of the corresponding channel or signal.

Each IAB node 230 may host two NR functions—mobile termination (MT) and distributed unit (DU). When functioning as a MT, the IAB node 230 may maintain the wireless backhaul connection towards an upstream IAB node (e.g., parent node 230-P or IAB donor 120). From the MT perspective, time-domain resources may be indicated for the parent links (e.g., DL parent BH link 225-DP, UL parent BH link 225-UP). The time-domain resources for the parent links may include DL parent, UL parent, and Flexible parent time resources.

When functioning as a DU, the IAB node 230 may provide access connection to UEs (e.g., UE 240) or downstream MTs of other IAB nodes (e.g., child IAB node 230-C). From the DU perspective, time-domain resources may be indicated for the child links (e.g., DL child BH link 225-DC, UL child BH link 225-UC, DL access link 235-D, UL access link 235-U). The time-domain resources for the child links may include DL child, UL child, Flexible child, and not-available child (resources not to be used for communication on DU child links) time resources.

The availability of the DL child, UL child, and the Flexible child time resources may be in one of two availability properties:
  Hard—corresponding time resource is always available for the DU child link;
  Soft—availability of corresponding time resource may be controlled, explicitly or implicitly, by the parent node.

The IAB node 230 may be configured with IAB node specific resources in time available for the parent and child links.

In legacy IAB system without full-duplex, an IAB node is unable to perform concurrent Tx (transmission) and Rx (reception). This means that among the six communication links, any reception link cannot have concurrent data transfer with any transmission link. This does not necessarily present an issue when transmission and reception traffic are static since the pattern for non-concurrent transmission and reception time slots can be given according to the proportion of transmission traffic and reception traffic.

However, for dynamic transmission and/or reception traffic, urgent traffic can occur in inverse-direction time slots. That is, urgent transmission traffic may occur in a reception time slot and/or urgent reception traffic may occur in a transmission time slot. Non-concurrent transmission-reception patterns cannot satisfy requirements of such urgent traffic. Moreover, the existing half-duplex mode restricts radio resource spectrum efficiency, which in turn lowers the system throughput.

Figure 3:
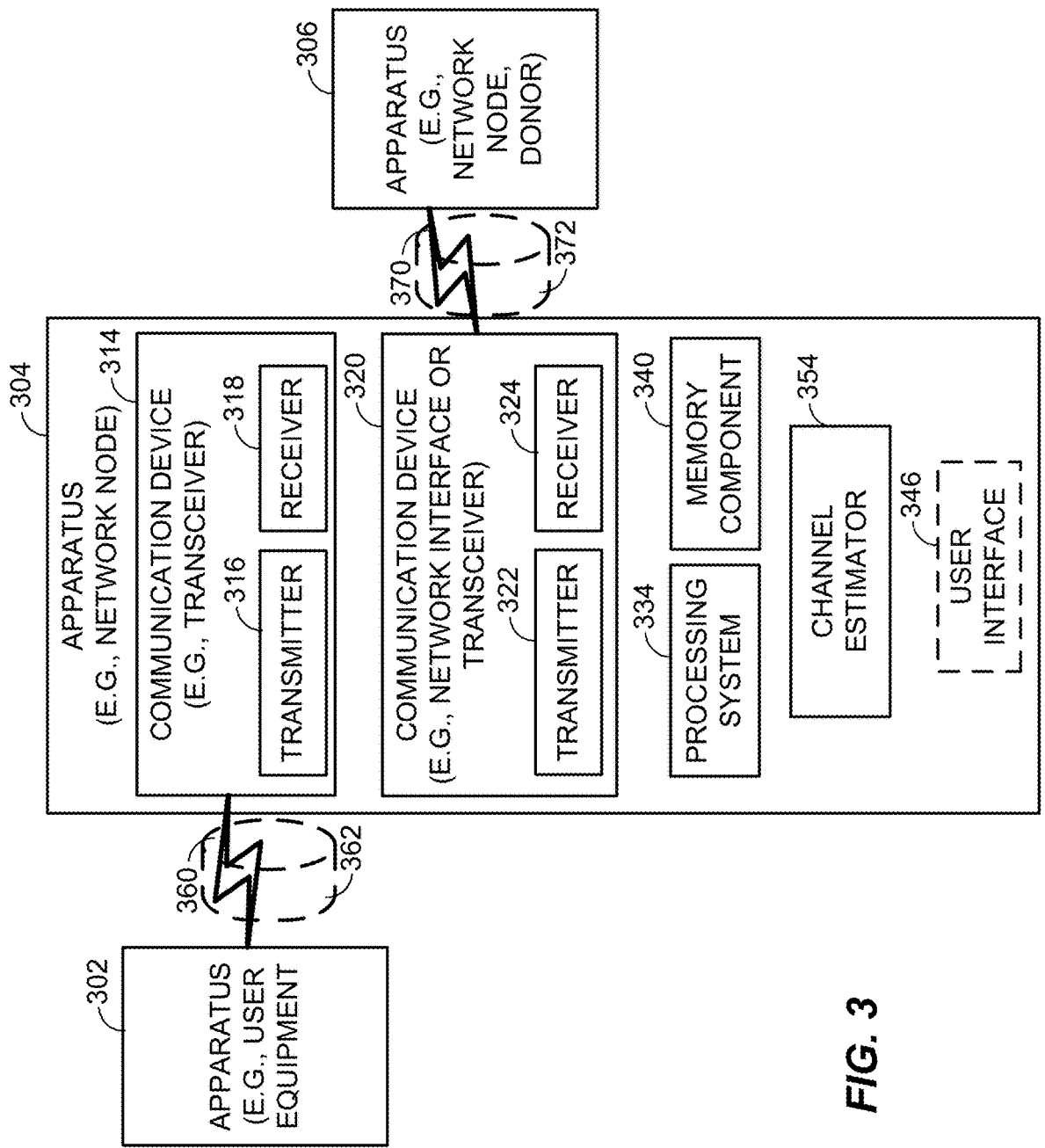
FIG. 3 illustrates examples of apparatuses configured for full-duplex communication, according to various aspects.

To address some or all issues associated with the legacy IAB system, it is proposed to use FD (full-duplex) communication at a network node of a network. In an aspect, the network node may be an IAB node. FIG. 3 illustrates several sample components (represented by corresponding blocks) that may be incorporated into an apparatus 302 (e.g., a UE), an apparatus 304 (e.g., a network node, an IAB node), and an apparatus 306 (e.g., OAM (operation and maintenance, donor node (e.g., IAB donor), CN (core network) node), etc.) to support the operations as disclosed herein. It will be appreciated that the components may be implemented in different types of apparatuses in different implementations (e.g., in an ASIC, in SOC (System-on-Chip), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 304 may include a wireless communication device (represented by the communication device 314) for communicating with other nodes via at least one designated RAT (e.g., LTE, 5G NR). The communication device 314 may at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming". Similarly, a receiver may include a plurality of antennas, such as an antenna array, that permits the respective apparatus to perform receive beamforming. In an aspect, the transmitter and receiver may share the same plurality of antennas, such that the respective apparatus can only receive or transmit at a given time, not both at the same time. A wireless communication device (e.g., one of multiple wireless communication devices) of the apparatus 304 may also comprise a NLM (Network Listen Module) or the like for performing various measurements.

The apparatus 304 may include a communication device (represented by the communication device 320) for communicating with other nodes. For example, the communication device 320 may comprise a network interface (e.g., one or more network access ports) that is configured to communicate with one or more network entities via a wire-based or wireless backhaul connection. In some aspects, the communication device 320 may be implemented as a transceiver configured to support wire-based or wireless signal communication. This communication may involve, for example, sending and receiving: messages, parameters, or other types of information. Accordingly, in the example of FIG. 3, the communication device 320 is shown as comprising a transmitter 322 and a receiver 324 (e.g., network access ports for transmitting and receiving). The communication devices 314 and 320 may be separate devices or may be integrated together into one device.

The apparatus 304 may also include other components that may be used in conjunction with the operations as disclosed herein. The apparatus 304 may include a processing system 334 for providing functionality relating to, for example, determining interferences as disclosed herein and for providing other processing functionality. In an aspect, the processing system 334 may include, for example, one or more general purpose processors, multi-core processors, ASICs, DSPs (digital signal processor), FGPAs (field programmable gate array), or other programmable logic devices or processing circuitry.

The apparatus 304 may include memory component 340 (e.g., each including a memory device) for maintaining information (e.g., information indicative of reserved resources, thresholds, parameters, and so on). In addition, the apparatus 304 may include a user interface device 346 for providing indications (e.g., audible and/or visual indications) to a user and/or for receiving user input (e.g., upon user actuation of a sensing device such a keypad, a touch screen, a microphone, and so on). For convenience, the apparatus 304 is shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 314, 320, 334, 340, and 346 may be implemented by processor and memory component(s) of the apparatus 304 (e.g., by execution of appropriate code and/or by appropriate configuration of processor components).

The apparatus 304 may transmit and receive messages via a wireless link 360 with the apparatus 302, the messages including information related to various types of communication (e.g., voice, data, multimedia services, associated control signaling, etc.). The wireless link 360 may operate over a communication medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302.

The apparatus 304 may also transmit and receive messages via a wireless link 370 with the apparatus 306, the messages including information related to various types of communication (e.g., voice, data, multimedia services, associated control signaling, etc.). The wireless link 370 may operate over a communication medium 372, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 306. The communication mediums 362 and 372 may overlap in resources—e.g., in frequency, time, and/or in code.

Apparatus 304 may include a channel estimator component 354, which may be used to estimate and/or predict channel conditions (e.g., interferences) of channels and/or links between the apparatuses 304 and 302. The channel estimator component 354 may also be used to estimate and/or predict channel conditions of channels and/or links between the apparatuses 304 and 306.

Figure 4:
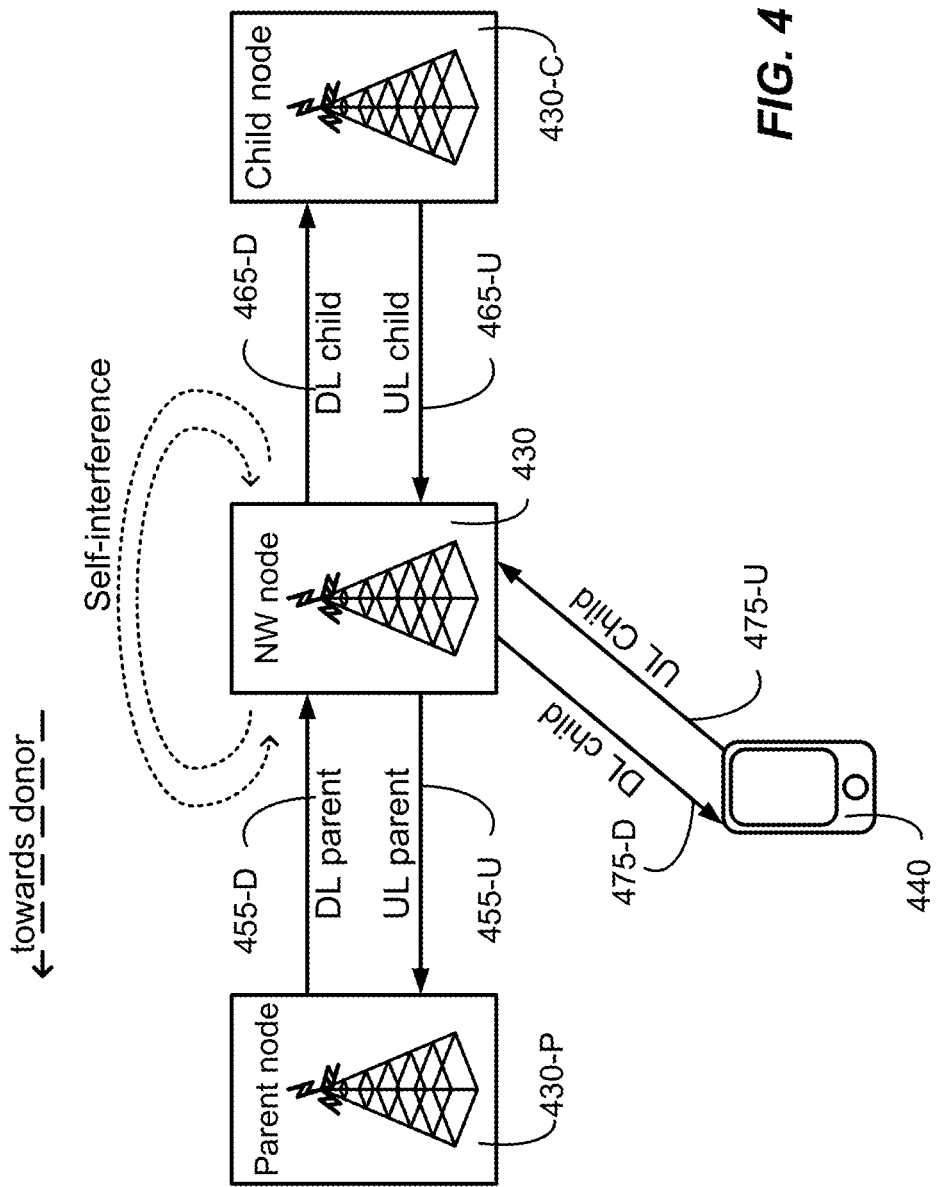
FIG. 4 illustrates an example view of a wireless communication system involved in full-duplex communication, according to various aspects.

FIG. 4 illustrates an example view of wireless communication system, e.g., such as the wireless communication system 100, from a perspective of a network node 430 to enable full-duplex communication. In FIG. 4, the network node 430 may be serving a UE 440, and may be in communication with a parent network node (or simply "parent node") 430-P which is immediately upstream, and a child network node (or simply "child node") 430-C which is immediately downstream.

In an aspect, the network node 430 may correspond to the apparatus 304 of FIG. 3. The network node 430 may have six (6) kinds of communication links in which three (3) may be transmission links and three may be reception links:

Reception links:
DL parent link 455-D—to receive traffic from the parent node 430-P;
UL child link 465-U—to receive traffic from the child node 430-C;
UL child link 475-U—to receive traffic from the UE 440;

Transmission links:
UL parent link 455-U—to transmit traffic to the parent node 430-P;
DL child link 465-D—to transmit traffic to the child node 430-C;
DL child link 475-D—to transmit traffic to the UE 440.

The DL parent BH link 225-DP, the UL child BH link 225-UC, and the UL access link 235-U may respectively be examples of the reception links DL parent link 455-D, the UL child link 465-U, and the UL child link 475-U. The UL parent BH link 225-UP, the DL child BH link 225-DC, and the DL access link 235-D may respectively be examples of the transmission links UL parent link 455-U, the DL child link 465-D, and the DL child link 475-D.

The network node 430 may be an IAB node, and thus may host mobile termination (MT) and distributed unit (DU) functions. When functioning as a MT, the network node 430 may maintain the wireless connection (e.g., backhaul) towards an upstream network node (e.g., parent node 430-P, donor node (not illustrated), OAM (not illustrated), etc.). From the MT perspective, time-domain resources may be indicated for the parent links (e.g., DL parent link 455-D, UL parent link 455-U). The time-domain resources for the parent links may include DL parent, UL parent, and F (Flexible) parent time resources.

When functioning as a DU, the network node 430 may provide access connection to UEs (e.g., UE 440) or downstream MTs of other network nodes (e.g., child node 430-C). From the DU perspective, time-domain resources may be indicated for the child links (e.g., DL child link 465-D, UL child link 465-U, DL child link 475-D, DL child link 475-U). The time-domain resources for the child links may include DL child, UL child, F (Flexible) child, and NA (not-available) child (resources not to be used for communication on DU child links) time resources.

The availability of the DL child, UL child, and the Flexible child time resources may be in one of two availability properties:
H (hard)—corresponding time-domain resource is always available for the DU child link;
S (soft)—availability of corresponding time resource may be controlled, explicitly or implicitly, by the parent node.

The network node 430 may be configured with network node specific resources in time available for the parent and child links.

Recall from above that a transmitted signal on any transmission link can cause self-interference to a received signal on any reception link. In FIG. 4, this implies that in the downlink direction, different beams (e.g., beam forming direction, transmit power) used on the DL child links 465-D, 475-D can cause different self-interferences on the DL parent link 455-D. Different beams used on the DL parent link 455-D may have different immunities to the self-interferences from the DL child links 465-D (to child node 430-C), 475-D (to UE 440).

Without any mitigation (e.g., without priority regulation), undesirable scenarios may occur. For example, a victim link (e.g., the DL parent link 455-D) may carry high priority information (e.g., urgent data packet, low latency packet, etc.). Unfortunately, a beam may be chosen for an aggressor link (e.g., DL child link 465-D and/or the 475-D) that causes a strong interference to the victim link.

To address these and other issues, one or more techniques are proposed to efficiently determine beams for the DL parent link 455-D and the DL child link 465-D/475-D to enable FD communication—concurrent transmission and reception—at the network node 430. In this way, dynamic traffic allocation may be supported, system capacity may be improved, and or the capability to quickly deliver packets in any direction may be provided.

Generally, it is proposed to determine FD priorities of the DL parent and child links. For example, one of the links (one of the DL parent and child links) may be determined as a primary link and the other (other of the DL parent and child links) may be determined as a secondary link, in which the primary link is prioritized over the secondary link. In an aspect, the link priorities may be determined based on the resource types of the time-domain resources of the DL parent and child links. Once the primary and secondary links are determined, primary beam—the beam for use on the primary link—may be determined. Thereafter, secondary beam—the beam for use on the secondary link—may be determined such that the interference between the primary and secondary links is minimized, e.g., to below a threshold interference such as thermal noise power, or the interference between the primary and secondary links satisfies other criterion, e.g. maximum signal-to-interference-plus-noise ratio (SINR).

In an aspect, the FD priorities of the DL parent and the DL child links may be determined according to their preconfigured resource types of their time-domain resources. In the discussions that follow, communications between the network node and the child node (e.g., child node 430-C) will be described. But it should be noted that unless specifically indicated otherwise, the description involving the child node can be readily applied to communication between the network node and a UE (e.g., UE 440).

For the network node 430, radio resources for links may be defined based on their properties, e.g., directional property, FD (full-duplex) priority property, availability property, etc. In other words, a radio resource of a link may have various combinations of directional, FD priority, and availability properties. The directional property may be one of:

DL (downlink)—the resource is for downlink communication;
UL (uplink)—the resource is for uplink communication;
F (Flexible)—the resource can be for either downlink or uplink communication.

For the network node 430, a radio resource of the DL parent link 455-D may be preconfigured with one of three FD priority properties for the network node 430:

Non-FD—the DL parent link takes full use of the radio resource;
P-FD—the DL parent link is the primary link, the DL child link is the secondary link;
S-FD—the DL parent link is the secondary link, the DL child link is the secondary link.

Similarly, a radio resource of the DL child link 465-D, 475-D may be preconfigured in one of three full-duplex (FD) priority types for the network node 430:

Non-FD—the DL child link takes full use of the radio resource;
P-FD—the DL child link is the primary link, the DL parent link is the secondary link;
S-FD—the DL child link is the secondary link, the DL parent link is the secondary link.

It should be noted that the DL parent and the DL child links for a radio resource should not both be primary and also should not both be secondary at the same time. Further, the availability types of the resources of the child links (e.g., DL child, UL child, Flexible child) may be one of:

Hard—corresponding time resource is always available for the DU child link;
Soft—availability of corresponding time resource may be controlled, explicitly or implicitly, by the parent node.

The network node 430 may be configured with network node specific resources in time available for the parent and child links. For FD communication (full-duplex transmission and reception), radio resources may be configured for both the parent link and the child link. For ease of description, "child time-domain resources" will be used to refer to radio resources allocated/configured for use on child links (e.g., on DL and UL child links 465-D, 465-U, 475-D, 475-U), and "parent time-domain resources" will be used to refer to radio resources allocated/configured for use on parent links (e.g., on DL and UL parent links 455-D, 455-U). The reason that the term "time-domain" is merely to emphasize the resources considered in the context of FD communication, i.e., concurrent transmission and reception.

For FD communication, a parent radio resource and a child radio resource may be configured/allocated to coincide or at least overlap in time. In other words, the network node 430 may concurrently utilize the parent and child time-domain resources to communicate with the parent and child nodes. For the parent link, the parent time-domain resource (e.g., from the MT perspective/view) may have one of the following directional properties—DL, UL, F (Flexible). For example, if the directional property of a particular parent resource is DL or F, that particular parent resource may be used to receive traffic on the DL parent link.

For the child link, the child time-domain resource may one of the following combinations of directional and availability properties-DL-H (hard), DL-S (soft), UL-H, UL-S, F-H, or F-S. For example, if the combination properties of a particular child resource is DL-H, DL-S, F-H, or F-S, that particular child resource may be used to transmit traffic on the DL child link.

TABLE 1

FD possible time-domain resource type pair

| DU View: | MT View: Parent Link | | |
|---|---|---|---|
| Child Link | DL | UL | F |
| DL-H | FD possible (DL) | | FD possible (DL) |
| DL-S | FD possible (DL) | | FD possible (DL) |
| UL-H | | FD possible (UL) | FD possible (UL) |
| UL-S | | FD possible (UL) | FD possible (UL) |
| F-H | FD possible (DL) | FD possible (UL) | FD possible (DL, UL) |
| F-S | FD possible (DL) | FD possible (UL) | FD possible (DL, UL) |

In an aspect, a subset of the (parent, child) resource type pairs may be identified in which full-duplex is possible as seen in Table 1. It should be noted that the Table 1 applies to concurrent or at least overlapping pair of parent/child time-domain resources. When a resource type pair is identified as "FD possible (DL)" or as "FD possible (DL, UL)", this indicates that under such time-domain resource type configuration, the DL parent link and the DL child link have the possibility of working in full-duplex.

As an illustration, assume that a particular parent resource has DL as its directional property and that a particular child resource has DL-H as its directional and availability properties. Under this resource type pair, FD communication may take place. That is, the network node may concurrently 1) transmit traffic carried on the particular child resource to the child node over the DL child link, and 2) receive traffic carried on the particular parent resource from the parent node over the DL parent link.

Table 1 indicates that the type pairs (DL, DL-H), (DL, DL-S), (DL, F-H), (DL, F-S), (F, DL-H), (F, DL-S), (F, F-H), (F, F-S) are the (parent, child) type pairs in which downlink full-duplex communication may be possible. For each of the configurations in which downlink FD communication is possible, there can be different options for determining which of the DL parent and child links will be the primary and secondary links. That is, there can be different FD priority determination options.

Before proceeding further, the terms "primary" and "secondary" are used merely to indicate which link will be prioritized over the other. There may be many different priority levels for the links. The terms "primary" and "secondary" are used merely to indicate that between two links—e.g., between the DL parent link and the DL child link—one of the links will be prioritized over the other based on their priority levels.

In a first downlink FD determination option, for each downlink FD possible configuration of resource type pair (e.g., FD possible (DL), FD possible (DL, UL)), the DL parent link/DL child link can be either primary/secondary or secondary/primary. In other words, for each downlink FD possible pair, either link may be chosen as the primary or the secondary link.

For the first downlink FD determination option, there may be various ways of configuring FD priorities of the DL parent and child links. In one configuration way, the FD priorities of the DL parent link and/or the DL child link may be configured by an upstream node of the network node, i.e., any node closer to a donor node. For example, the FD priorities may be configured by a central network node such as an OAM (operation & management) node, a donor node (e.g., IAB donor), or the parent node.

In a second configuration way, an observation is made that in general, a network node can control the channel status of its child links, but not that of its parent links. Thus, in the second configuration, the FD priorities may be set, configured or otherwise determined based on the availability type of the DL child link resource. For example, if the availability type of the child time-domain resource is hard (e.g., DL-H, F-H), the network node may initially determine the FD priority of the DL child link and inform the parent node. The parent node may then determine the FD priority of the DL parent link as appropriate. Thus, in this example, if the network node 430 determines the FD priority type of the DL child link as P-FD, S-FD, or Non-FD, then the parent node may respectively set the FD priority type of the DL parent link as S-FD, P-FD, or NULL.

In another example, if the availability type of the child time-domain resource is soft, the network node may wait to receive an indication from the parent node that the FD priority of the DL parent link has been determined. The network node may then determine the FD priority of the DL child link as appropriate. Thus, in this example, if the FD priority type of the DL parent link is indicated as P-FD, S-FD, or Non-FD, then the network node 430 may respectively set the FD priority type of the DL child link as S-FD, P-FD, or NULL.

In a second downlink FD determination option, the FD priorities of the DL parent and child links may be determined based on the availability type of the DL child link. For example, if the availability type of the resource for the DL child link is hard (e.g., DL-H, F-H), then the DL parent link/DL child link may be set as secondary/primary. On the other hand, if the availability type of the resource for the DL child link is soft (e.g., DL-S, F-S), then the DL parent link/DL child link may be set as primary/secondary.

TABLE 2 primary/secondary possibilities for downlink

| DU View: Child Link | MT View: Parent Link | |
| --- | --- | --- |
| | DL | F |
| DL-H | 1) Primary parent link (Rx), Secondary child link (Tx) | 1) Primary parent link (Rx), Secondary child link (Tx) |
| | 2) Secondary parent link (Rx), Primary child link (Tx) (default) | 2) Secondary parent link (Rx), Primary child link (Tx) (default) |
| DL-S | 1) Primary parent link (Rx), Secondary child link (Tx) (default) | 1) Primary parent link (Rx), Secondary child link (Tx) (default) |
| | 2) Secondary parent link (Rx), Primary child link (Tx) | 2) Secondary parent link (Rx), Primary child link (Tx) |
| F-H | 1) Primary parent link (Rx), Secondary child link (Tx) | 1) Primary parent link (Rx), Secondary child link (Tx) |
| | 2) Secondary parent link (Rx), Primary child link (Tx) (default) | 2) Secondary parent link (Rx). Primary child link (Tx) (default) |
| F-S | 1) Primary parent link (Rx), Secondary child link (Tx) (default) | 1) Primary parent link (Rx), Secondary child link (Tx) (default) |
| | 2) Secondary parent link (Rx), Primary child link (Tx) | 2) Secondary parent link (Rx), Primary child link (Tx) |

For each (parent, child) resource type pair combinations in which downlink FD is possible (e.g., (DL, DL-H), (DL, DL-S), (DL, F-H), (DL, F-S), (F, DL-H), (F, DL-S), (F, F-H), (F, F-S)), the primary/secondary link determinations are listed in Table 2. In the first downlink FD determination option, all listed primary/secondary link determinations may be valid. In the second downlink FD determination option, only the determinations indicated as "default" may be valid.

Once the primary and secondary links are determined, then the primary beam (for use on the primary link) may be determined. Thereafter, the secondary beam (for use on the secondary link) may be determined such that interferences between the primary and secondary links are minimized. In an aspect, the primary and secondary beams may be determined based on the availability type and the FD priorities of the DL parent and child link resources. There are the following two use cases when determining the beams:

Use case 1: DL parent link: S-FD, DL child link: P-FD;
Use case 2: DL parent link: P-FD, DL child link: S-FD.

In use case 1, the DL child and parent links are respectively the primary and secondary links. Then the primary and secondary beams may respectively be the beam of the DL child link (referred to as the "DL child beam") and the beam of the DL parent link (referred to as the "DL parent beam"). In use case 2, the priorities of the DL child and parent links are reversed. That is, the DL parent and child links are respectively the primary and secondary links. Then the primary and secondary beams may respectively be the DL parent and child beams.

Recall that the DL child link is a transmission link and the DL parent link is a reception link from the perspective of the network node. Then the DL child beam may be the beam used by the network node to transmit traffic over the DL child link to the child node. The DL parent beam may be the beam used by the network node to receive traffic over the DL parent link from the parent node.

In an aspect, it may be assumed that the network node can take care of the channel status in the DL child link, but not in the DL parent link. This implies that the network node has control over the formation of the DL child beam. That is, the network node may set, configure, or otherwise determine the DL child beam.

The network node may not have control over the formation of the beams used by the parent node. Nonetheless, the network node may still "determine" the DL parent beam. For example, the parent node may form multiple beams for transmitting data. In this instance, the network node may "determine" the DL parent beam by selecting one of the multiple beams. Of course, it is recognized that in some circumstances, the network node may not be able to determine the DL parent beam. For example, the network node may notify the parent node about a beam report regarding the multiple beams and then the parent node may select a beam out of the reported beams as the beam to communicate with the network node.

The ways in which the DL child and parent beams are determined may differ for the use cases. Since the primary beam is determined before the secondary beam, then the secondary beam may be determined in light of the determined primary beam to minimize self-interferences.

In use case 1, this is equivalent to determining the DL child beam, and then thereafter determining the DL parent beam. In other words, the beam of the transmission link is first determined, and the beam of the reception link is determined thereafter. When the beam of the transmission link is the primary beam, this can imply that the transmission characteristics of the transmission link are more or less set before the beam of the reception link is determined. Then to minimize self-interference, the beam of the reception link should be determined so as to immunize the reception link to the extent possible from experiencing interferences due to transmissions over the transmission link.

Applying this to use case 1, the DL child beam may be determined, and the DL parent beam may be determined thereafter. The DL parent beam may be determined such that receptions over the DL parent link using the DL parent beam is maximally immune to the interferences from transmissions over the DL child link using the DL child beam. After parent node determines the DL parent beam, the parent node may indicate to the network node the determined DL parent beam prior to data transfer.

On the other hand, use case 2 is equivalent to determining the DL parent beam, and then thereafter determining the DL child beam. In other words, the beam of the reception link is first determined, and the beam of the transmission link is determined thereafter. When the beam of the reception link is the primary beam, this can imply that the reception characteristics of the reception link are more or less set before the beam of the transmission link is determined. Then to minimize self-interference, the beam of the transmission link should be determined such that the interferences to receptions over the reception link are minimized.

Applying this to use case 2, the DL parent beam may be determined, and the DL child beam may be determined thereafter. The DL child beam may be determined such that the transmissions over the DL child link using the DL child beam minimally interferes with the receptions over the DL parent link using the DL parent beam.

After the DL parent and child beams are determined (e.g., during data transfer), the network node may detect that the actual self-interference impacts the reception performance of the DL parent link beyond some tolerable limit. In such instances, the network node may take corrective actions. For example, the network node may trigger a determination of a new DL parent beam. The new DL parent beam may be determined based on the actual self-interference.

Figure 5:
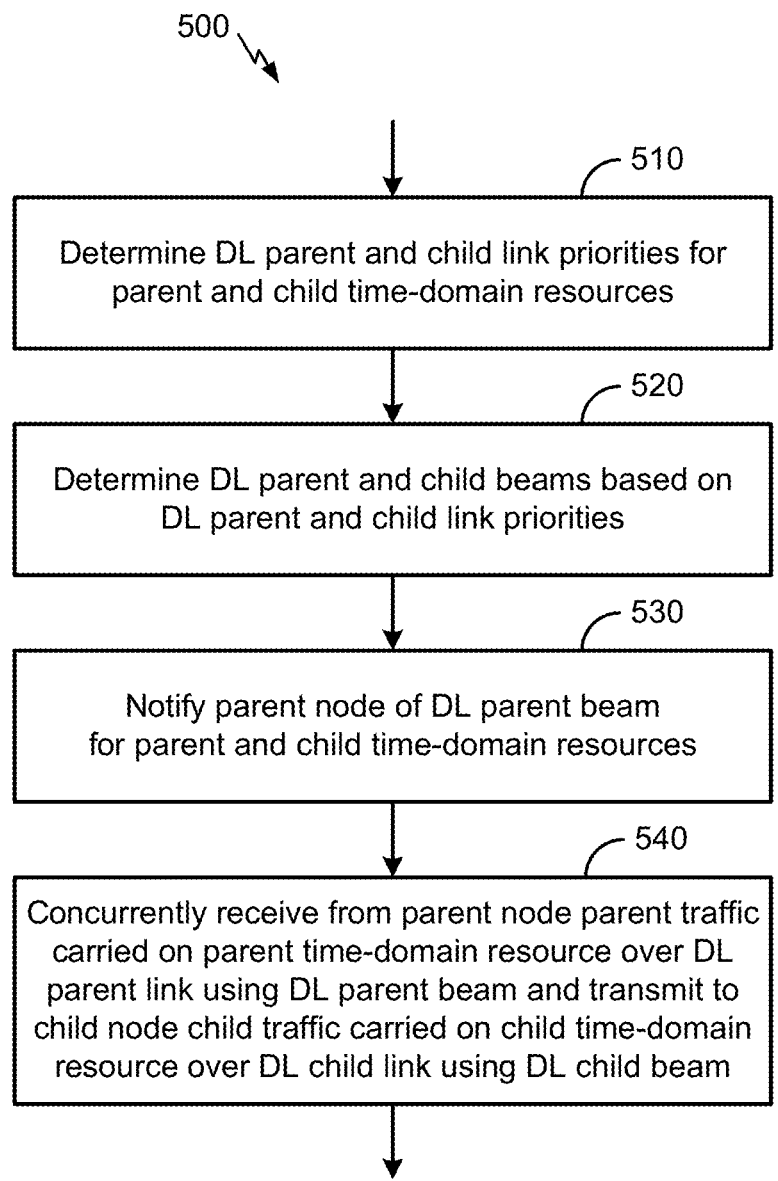
FIGS. 5-13 illustrate flowcharts of an exemplary method of a network node, according to one or more aspects.

FIG. 5 illustrates a flow chart of an example method of a network node (e.g., network node 430, apparatus 304) to perform full-duplex (FD) communication with a parent node (e.g., parent node 430-P, apparatus 306) and a child node (e.g., child node 430-C, UE 440, apparatus 302, apparatus 306). The FD communication may be in-band. In an aspect, the memory component 340 of the apparatus 304 may be an example of a non-transitory computer-readable medium storing computer-executable instructions of a network node to perform the method of FIG. 5.

In block 510, the network node may determine DL parent and child link priorities for a parent time-domain resource and a child time-domain resource. For example, one of the DL parent and child links may be determined as a primary link and the other of the DL parent and child links may be determined as a secondary link, with the primary link have a higher priority. In an aspect, means for performing block 510 may comprise the processing system 334 and/or the memory component 340 of the apparatus 304.

The parent time-domain resource may be a radio resource configured for parent traffic over a downlink (DL) parent link, and the child time-domain resource may be a radio resource configured for child traffic over a DL child link. The DL parent link may be a wireless link for use by the network node to receive parent traffic from the parent node, and the DL child link may be a wireless link for use by the network node to send child traffic to the child node.

The parent and child time-domain resources may comprise any combination of resources defined in the time-domain. For example, the parent time-domain resource may comprise any combination of one or more symbols, one or more slots, one or more sub-frames, one or more frames, etc. Similarly, the parent time-domain resource may comprise any combination of one or more symbols, one or more slots, one or more sub-frames, one or more frames, etc.

The parent and child time-domain resources may be concurrent, or overlap in time at least partially. Then when the network node uses the parent and child time-domain resources, the network node may concurrently communicate with the parent and child nodes. When the communication is in-band, the parent and child time resources may be resources in a same or adjacent frequency bands.

In an aspect, the DL parent and child link priorities for parent and child time-domain resources may have already been determined. For example, an upstream node (e.g., OAM node, donor node, parent node, grandparent node, etc.) may have preconfigured the DL parent and child links for the parent and child time-domain resources as being primary or secondary links. For example, FD priority of the DL parent link for the parent time-domain resource may have been preconfigured as P-FD or S-FD. Alternatively or in addition thereto, FD priority type of the DL child link for the child time-domain resource may have been preconfigured as P-FD or S-FD.

One caveat may be that the DL parent link DL parent link for the parent time-domain resource and the DL child link for the child time-domain resource are not both primary links simultaneously and also are not both secondary links simultaneously. This can ensure that both DL parent and child links are not primary links simultaneously and also are not secondary links simultaneously.

Figure 6:
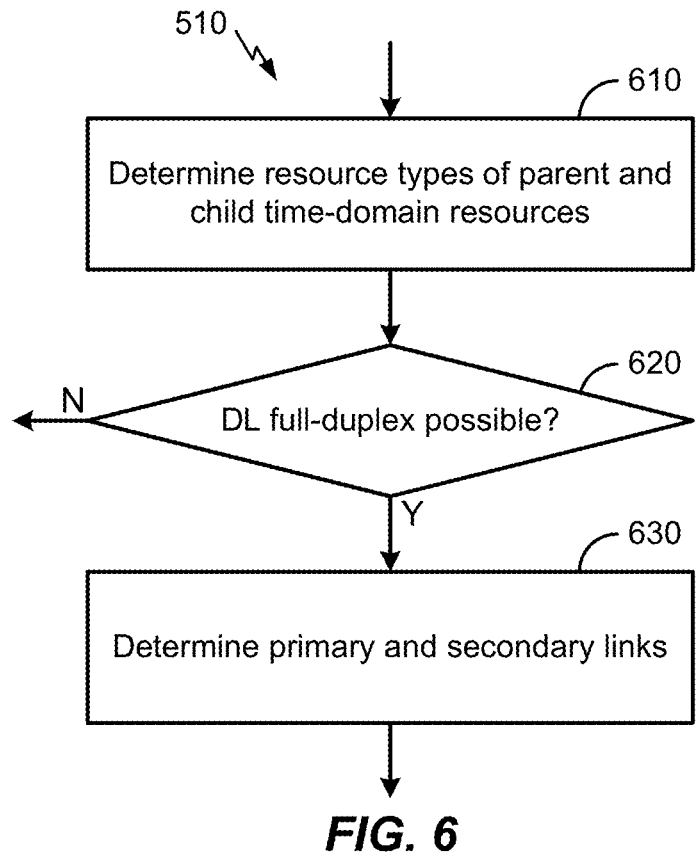

But in another aspect, the DL parent and child link priorities for parent and child time-domain resources may be determined based on resource types of the parent and child time-domain resources. FIG. 6 illustrates a flow chart of an example process to implement block 510 to determine the DL parent and child link priorities based on the resource types of the parent and child time-domain resources. In an aspect, the memory component 340 of the apparatus 304 may be an example of a non-transitory computer-readable medium storing computer-executable instructions of a network node to perform the process of FIG. 6.

In block 610, the network node may determine the resource types of the parent and child time-domain resources. In an aspect, means for performing block 610 may comprise the processing system 334 and/or the memory component 340 of the apparatus 304.

The resource type of the parent time-domain resource may be DL, UL or F (Flexible). DL resource type may indicate that the parent time-domain resource is available for traffic from the parent node to the network node. UL resource type may indicate that the parent time-domain resource is available for traffic from the network node to the parent node. Flexible resource type may indicate that the parent time-domain resource is available for traffic in either direction between the parent node and the network node.

The resource type of the child time-domain resource may be DL-Hard, DL-Soft, UL-Soft, UL-Hard, F-Hard or F-Soft. DL-Hard resource type may indicate that the child time-domain resource is always available for traffic from the network node to the child node. DL-Soft may indicate that the availability of the child time-domain resource for traffic from the network node to the child node is controlled by an upstream node. UL-Hard resource type may indicate that the child time-domain resource is always available for traffic from the child node to the network node. UL-Soft may indicate that the availability of the child time-domain resource for traffic from the child node to the parent node is controlled by an upstream node. F-Hard resource type may indicate that the child time-domain resource is always available for traffic in either direction between the network node and the child node. F-Soft may indicate that the availability of the child time-domain resource for traffic in either direction in between the network node and the child node is controlled by an upstream node.

In block 620, the network node may determine whether or not DL FD (downlink full-duplex) communication is possible based on the resource types of the parent and child time-domain resources. In an aspect, means for performing block 620 may comprise the processing system 334 and/or the memory component 340 of the apparatus 304.

The network node may determine whether or not the DL FD communication is possible based on the (parent, child) resource type pair combination of the parent and child time-domain resources. For example, when resource type pair is any of (DL, DL-H), (DL, DL-S), (DL, F-H), (DL, F-S), (F, DL-H), (F, DL-S), (F, F-H), (F, F-S), the network node may determine that the DL FD communication is possible. In other words, when the resource type of the parent time-domain resource is one of DL and F and the resource type of the child time-domain resource is one of DL-H, DL-S, F-H, and F-S, the DL FD communication may be determined to be possible.

If it is determined that the DL FD communication is possible ("y" branch from block 620), then in block 630, the network node may determine primary and secondary links. In an aspect, means for performing block 630 may comprise the processing system 334 and/or the memory component 340 of the apparatus 304. In block 630, the network node may decide that one of the DL parent and child links will be the primary link and the other of the DL parent and child links will be the secondary.

Figure 7:
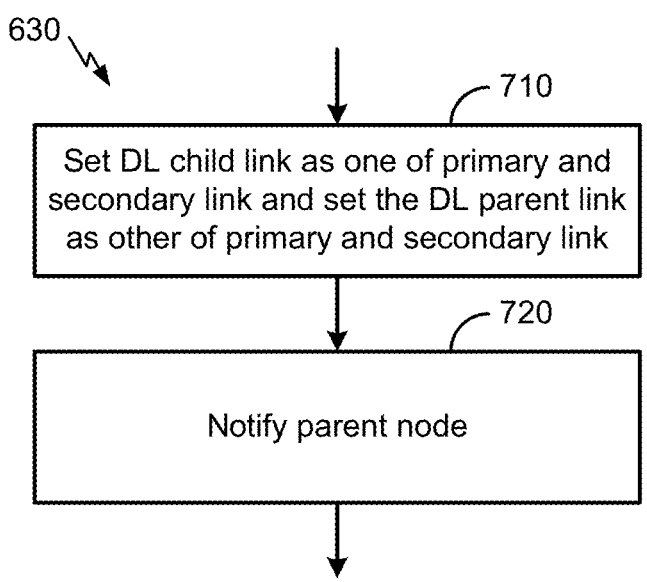

FIG. 7 illustrates a flow chart of an example process to implement block 630. In an aspect, the memory component 340 of the apparatus 304 may be an example of a non-transitory computer-readable medium storing computer-executable instructions of a network node to perform the process of FIG. 7.

In block 710, the network node may set the DL child link for the child time-domain resource to one of the primary link and secondary links and set the DL parent link for the parent time-domain resource to the other of the primary link and secondary links. In an aspect, means for performing block 710 may comprise the processing system 334 and/or the memory component 340 of the apparatus 304. The network node may default to setting the DL child link as the primary link when the child time-domain resource is determined to be hard.

In block 720, the network node may notify the parent node, e.g., of the DL child link setting. In an aspect, means for performing block 720 may comprise the processing system 334, the memory component 340, and/or the communication device 320 of the apparatus 304. By notifying the parent node, the parent node may also set the DL parent link to the other of the primary link and secondary links as appropriate.

Figure 8:
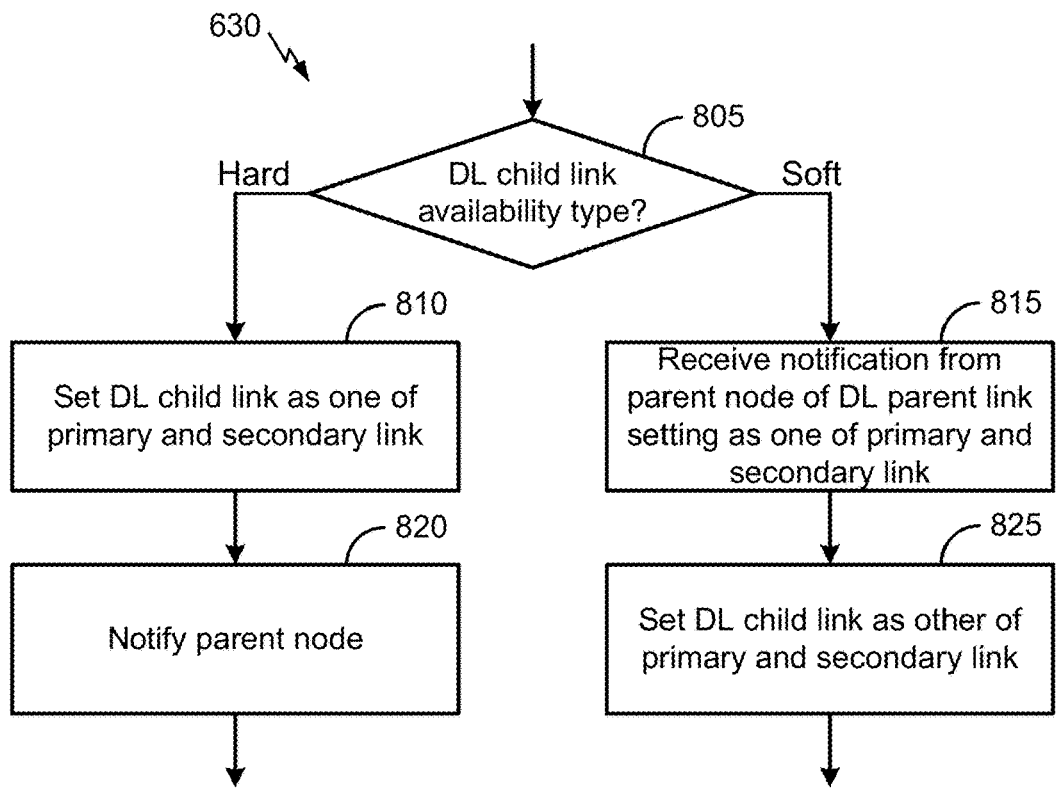

FIG. 8 illustrates a flow chart of another example process to implement block 630. In this example process, the network node may initiate the setting of the primary and secondary links or defer the initial setting to the parent node. In an aspect, the memory component 340 of the apparatus 304 may be an example of a non-transitory computer-readable medium storing computer-executable instructions of a network node to perform the process of FIG. 8.

In block 805, the network node may determine whether the availability property of the DL child link for the child time-domain resource is hard (e.g., DL-Hard, Flexible-Hard) or soft (e.g., DL-Soft, Flexible-Soft). In an aspect, means for performing block 805 may comprise the processing system 334 and/or the memory component 340 of the apparatus 304.

If the DL child link for the child time-domain resource is determined to be hard ("hard" branch from block 805), then in block 810, the network node may set the DL child link to be one of the primary link and secondary links. In an aspect, means for performing block 810 may comprise the processing system 334 and/or the memory component 340 of the apparatus 304.

By setting the DL child link, the DL parent link is effectively set to the other of the primary link and secondary links. In an aspect, the network node may default to setting the DL child link as the primary link when the child time-domain resource is determined to be hard.

In block 820, the network node may notify the parent node of the DL child link setting. In an aspect, means for performing block 820 may comprise the processing system 334, the memory component 340, and/or the communication device 320 of the apparatus 304. By notifying the parent node, the parent node may also set the DL parent link to the other of the primary link and secondary links as appropriate.

On the other hand, if the DL child link for the child time-domain resource is determined to be soft ("soft" branch from block 805), then in block 815, the network node may wait to receive notification from the parent node indicating that the DL parent link has been set to one of the primary link and secondary links. In an aspect, means for performing block 815 may comprise the processing system 334, the memory component 340, and/or the communication device 320 of the apparatus 304.

In block 825, the network node may set the DL child link for the child time-domain resource to the other of the primary link and secondary links. In an aspect, means for performing block 825 may comprise the processing system 334 and/or the memory component 340 of the apparatus 304.

Figure 9:
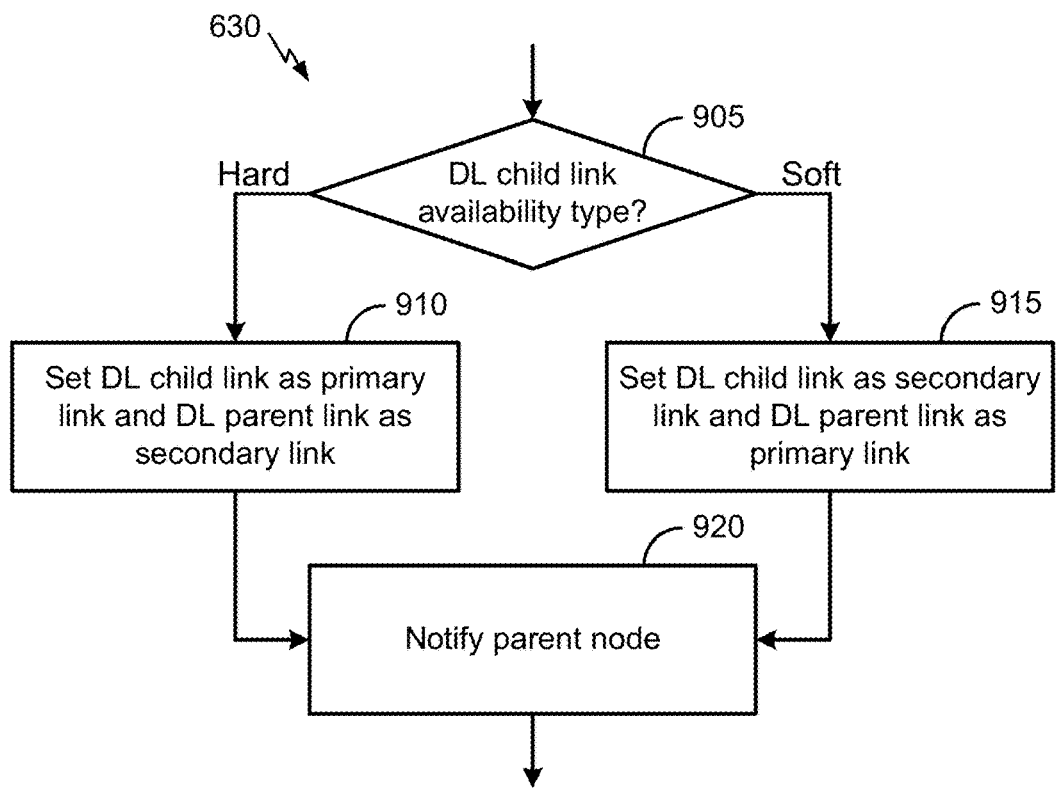

FIG. 9 illustrates a flow chart of a further example process to implement block 630. In this example process, the network node may determine fully determine the setting of the primary and secondary links. In an aspect, the memory component 340 of the apparatus 304 may be an example of a non-transitory computer-readable medium storing computer-executable instructions of a network node to perform the process of FIG. 9.

In block 905, the network node may determine whether the availability property of the DL child link for the child time-domain resource is hard (e.g., DL-Hard, Flexible-Hard) or soft (e.g., DL-Soft, Flexible-Soft). In an aspect, means for performing block 905 may comprise the processing system 334 and/or the memory component 340 of the apparatus 304.

If the DL child link is determined to be hard ("hard" branch from block 905), then in block 910, the network node may set the DL child link for the child time-domain resource as the primary link and the DL parent link for the parent time-domain resource as the secondary link. In an aspect, means for performing block 910 may comprise the processing system 334 and/or the memory component 340 of the apparatus 304.

On the other hand, If the DL child link is determined to be soft ("soft" branch from block 905), then in block 915, the network node may set the DL child link for the child time-domain resource as the secondary link and the DL parent link for the parent time-domain resource as the primary link. In an aspect, means for performing block 915 may comprise the processing system 334 and/or the memory component 340 of the apparatus 304.

In block 920, the network node may notify the parent node of the DL parent and/or child link settings. In an aspect, means for performing block 920 may comprise the processing system 334, the memory component 340, and/or the communication device 320 of the apparatus 304. By notifying the parent node, the parent node may also set the DL parent link to the other of the primary link and secondary links as appropriate.

FIGS. 7 and 8 may be analogous to the first downlink FD determination option discussed above in which all listed primary/secondary link determinations of Table 2 may be considered to be valid. On the other hand, FIG. 9 may be analogous to the second downlink FD determination option in which the determinations indicated as "default" may be valid.

Referring back to FIG. 5, in block 520, the network node may determine the DL parent and child beams based on the DL parent and child link priorities. In an aspect, means for performing block 520 may comprise the processing system 334 and/or the memory component 340 of the apparatus 304. The DL parent beam may be used by the network node to receive parent traffic carried on the parent time-domain resource from the parent node over the DL parent link, and the DL child beam may be used by the network node to send child traffic carried on the child time-domain resource to the child node over the DL child link.

Figure 10:
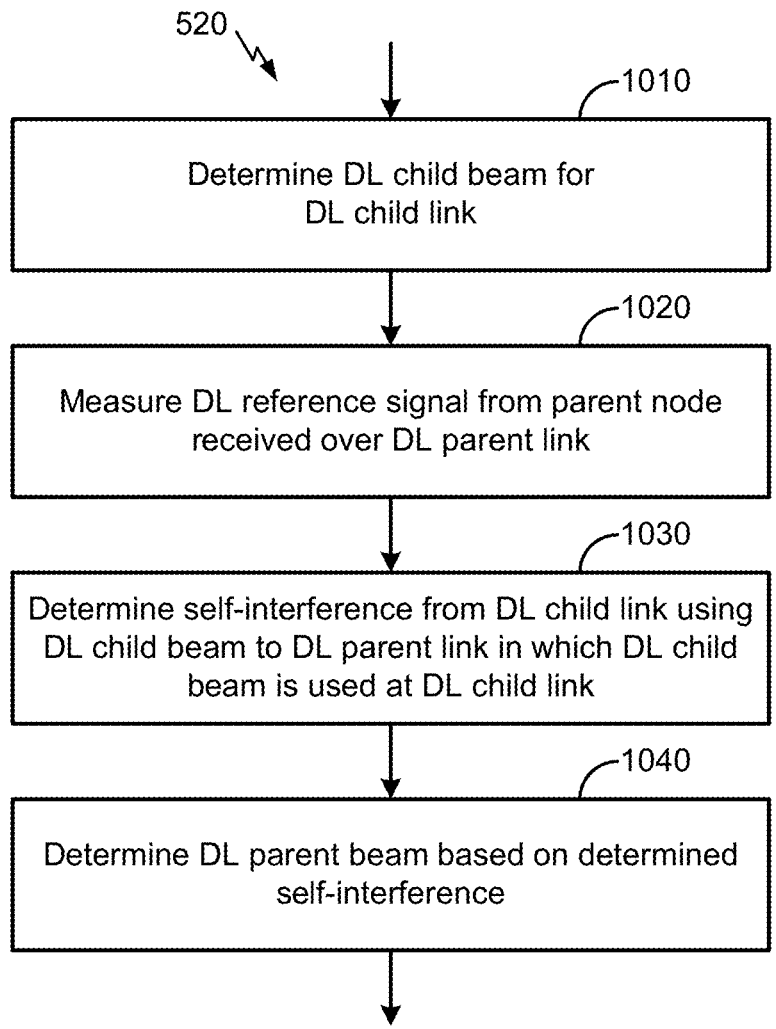

FIG. 10 illustrates a flow chart of an example process to implement block 520 when the primary link is the DL child link and the secondary link is the DL parent link. In an aspect, the memory component 340 of the apparatus 304 may be an example of a non-transitory computer-readable medium storing computer-executable instructions of a network node to perform the process of FIG. 10.

In block 1010, the network node may determine the DL child beam for the DL child link. In an aspect, means for performing block 1010 may comprise the processing system 334 and/or the memory component 340 of the apparatus 304. In this instance, the DL child beam is the primary and the beam used on transmission link (DL child link).

In block 1020, the network node may measure a DL reference signal (RS) from the parent node received over the DL parent link. In an aspect, means for performing block 1010 may comprise the processing system 334, the memory component 340, the communication device 320, and/or the channel estimator 354 of the apparatus 304.

In block 1030, the network node 430 may determine self-interference from the DL child link to the DL parent link in which the determined DL child beam is used on the DL child link. In an aspect, means for performing block 1010 may comprise the processing system 334, the memory component 340, and/or the channel estimator 354 of the apparatus 304.

At block 1040, the network node 430 may determine the DL parent beam (i.e., the secondary beam) based on the determined self-interference. In an aspect, means for performing block 1040 may comprise the processing system 334 and/or the memory component 340 of the apparatus 304.

In one aspect, the DL parent beam may be determined such that the self-interference at the DL parent link due to transmissions on the DL child link using the DL child beam is at or below a threshold interference. An example of the threshold interference may be thermal noise power.

Alternatively or in addition thereto, a parent beam from a set of parent beams may be selected as the DL parent beam. The set of parent beams may comprise one or more beams for communication between the network node and the parent node. The selected DL parent beam may be the parent beam whose beamforming gain divided by the determined self-interference strength is the largest among the set of parent beams.

Figure 11:
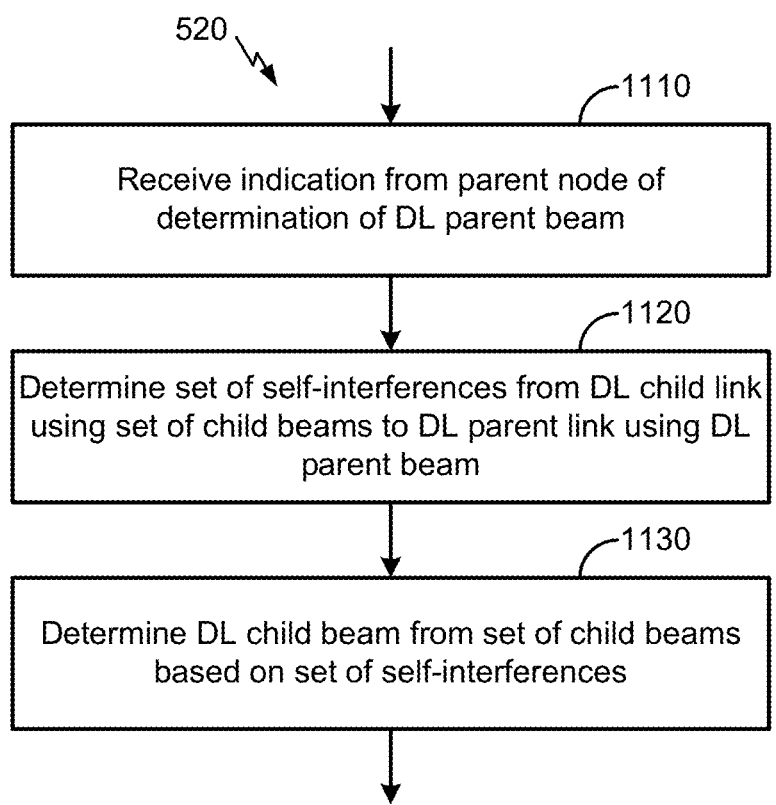

FIG. 11 illustrates a flow chart of an example process to implement block 520 when the primary link is the DL parent link and the secondary link is the DL child link. In an aspect, the memory component 340 of the apparatus 304 may be an example of a non-transitory computer-readable medium storing computer-executable instructions of a network node to perform the process of FIG. 11.

In block 1110, the network node may receive a notification from the parent node about a determination of the DL parent beam. In an aspect, means for performing block 1110 may comprise the processing system 334, the memory component 340, and/or the communication device 320 of the apparatus 304.

In an aspect, the notification may in the form of a message and/or a DL reference signal (RS) (e.g., CSI-RS) from the parent node over the DL parent link using the DL parent beam. The message may indicate that that a full-duplex (FD) priority associated with the DL RS or the DL parent beam is primary FD. For example, the parent node may identify to the network node a CSI-RS resource to indicate that the CSI-RS sent at the CSI-RS resource uses the DL parent beam for the DL parent link for time-domain resources where a full-duplex (FD) priority of the DL parent link is primary FD, and/or for time-domain resources where the DL child link is correspondingly in time-domain resources whose resource types are DL-Soft or Flexible-Soft.

In block 1120, the network node may determine a set of self-interferences from the DL child link using a set of child beams to the DL parent link using the DL parent beam. The set of child beams may comprise one or more beams for communication between the network node and the child node. In an aspect, means for performing block 1120 may comprise the processing system 334, the memory component 340 and/or the channel estimator 354 of the apparatus 304.

In block 1130, the network node 430 may determine the DL child beam from the set of child beams based on the set of self-interferences. In an aspect, means for performing block 1130 may comprise the processing system 334 and/or the memory component 340 of the apparatus 304.

The child beam whose self-interference from the DL child link using the child beam to the DL parent link using the DL parent beam is at or below a threshold interference (e.g., thermal noise power) may be selected as the DL child beam. Alternatively or in addition thereto, child beam whose self-interference from the DL child link using the child beam to the DL parent link using the DL parent beam is the lowest among the set of child beams may be selected as the DL child beam.

Figure 12:
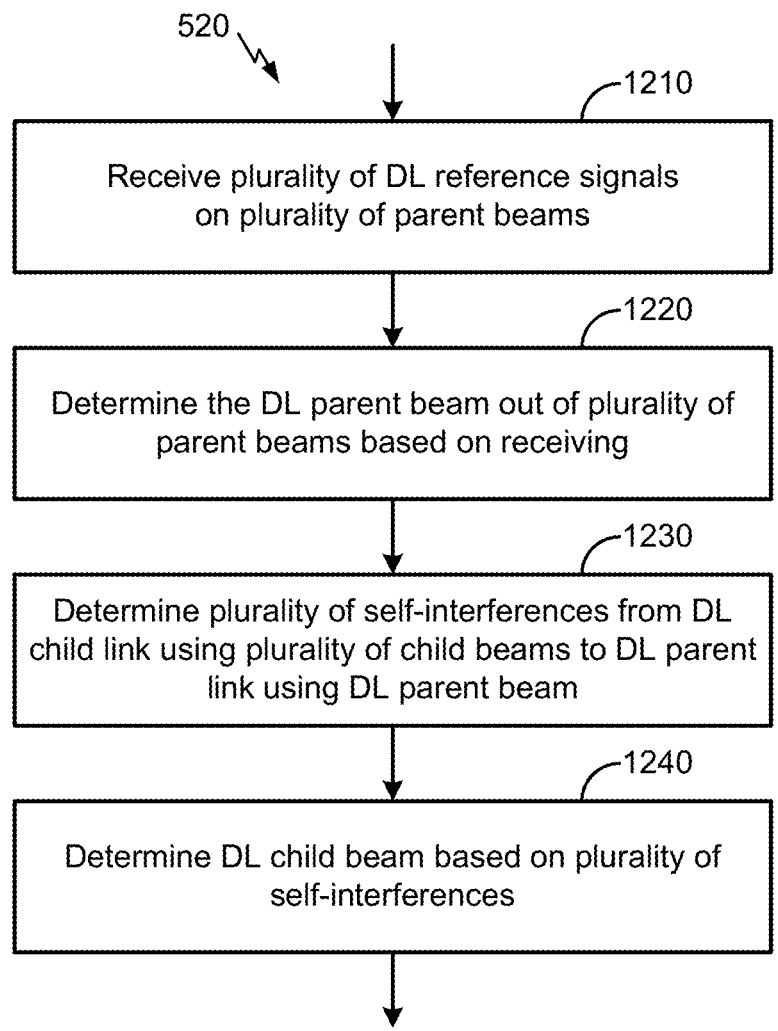

FIG. 12 illustrates a flow chart of another example process to implement block 520 when the primary link is the DL parent link and the secondary link is the DL child link. In an aspect, the memory component 340 of the apparatus 304 may be an example of a non-transitory computer-readable medium storing computer-executable instructions of a network node to perform the process of FIG. 12.

In block 1210, the network node may receive a plurality of DL reference signals from the parent node over the DL parent link using a plurality of parent beams. Each parent beam may be a beam for communication between the network node and the parent node. In an aspect, means for performing block 1210 may comprise the processing system 334, the memory component 340, and/or the communication device 320 of the apparatus 304.

In block 1220, the network node may determine the DL parent beam out of the plurality of parent beams based on the receiving. In an aspect, means for performing block 1220 may comprise the processing system 334 and/or the memory component 340 of the apparatus 304.

In block 1230, the network node may determine a plurality of self-interferences from the DL child link using a plurality of child beams to the DL parent link using the DL parent beam. Each child beam may be a beam for communication between the network node and the child node. In an aspect, means for performing block 1230 may comprise the processing system 334, the memory component 340 and/or the channel estimator 354 of the apparatus 304.

In block 1240, the network node 430 may determine the DL child beam from the plurality of child beams based on the plurality of self-interferences. In an aspect, means for performing block 1240 may comprise the processing system 334 and/or the memory component 340 of the apparatus 304.

The child beam whose self-interference from the DL child link using the child beam to the DL parent link using the DL parent beam is at or below a threshold interference (e.g., thermal noise power) may be selected as the DL child beam. Alternatively or in addition thereto, child beam whose self-interference from the DL child link using the child beam to the DL parent link using the DL parent beam is the lowest among the plurality of child beams may be selected as the DL child beam.

Figure 13:
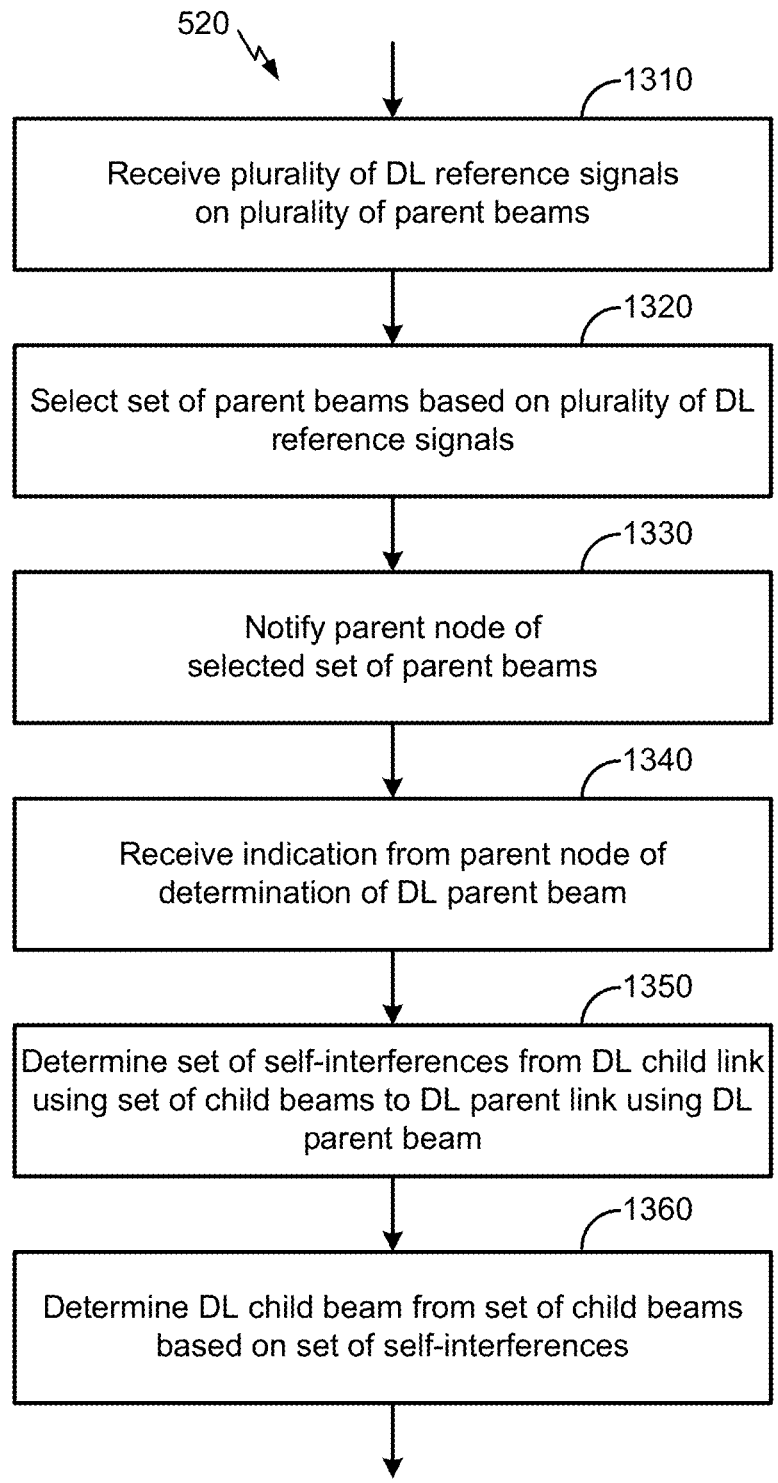

FIG. 13 illustrates a flow chart of yet another example process to implement block 520 when the primary link is the DL parent link and the secondary link is the DL child link. In an aspect, the memory component 340 of the apparatus 304 may be an example of a non-transitory computer-readable medium storing computer-executable instructions of a network node to perform the process of FIG. 13.

In block 1310, the network node may receive a plurality of DL reference signals from the parent node over the DL parent link using a plurality of parent beams. Each parent beam may be a beam for communication between the network node and the parent node. In an aspect, means for performing block 1310 may comprise the processing system 334, the memory component 340, and/or the communication device 320 of the apparatus 304.

In block 1320, the network node may select a set of parent beams based on the plurality of DL reference signals. The set of parent beams may comprise one or more beams for communication between the network node and the parent node. In an aspect, means for performing block 1320 may comprise the processing system 334 and/or the memory component 340 of the apparatus 304.

The set of parent beams may be selected based on the signal qualities of the corresponding DL reference signals. For example, each selected parent beam may be a parent beam whose signal-to-noise ratio (SNR) and/or signal-to-interference-and-noise ratio (SINR) of the corresponding DL RS is at or above a threshold SNR and/or threshold SINR (e.g., at least above the thermal noise power).

In block 1330, the network node may notify the parent node regarding the set of parent beams. In an aspect, means for performing block 1330 may comprise the processing system 334, the memory component 340, and/or the communication device 320 of the apparatus 304.

In block 1340, the network node may receive a notification from the parent node about a determination of the DL parent beam. The DL parent beam may be a parent beam of the set of parent beams. In an aspect, means for performing block 1340 may comprise the processing system 334, the memory component 340, and/or the communication device 320 of the apparatus 304.

In an aspect, the notification from the parent node may in the form of a message and/or a DL reference signal (RS) (e.g., CSI-RS) from the parent node over the DL parent link using the DL parent beam. The message may indicate that that a full-duplex (FD) priority associated with the DL RS or the DL parent beam is primary FD. For example, the parent node may identify to the network node a CSI-RS resource to indicate that the CSI-RS sent at the CSI-RS resource uses the DL parent beam for the DL parent link for time-domain resources where a full-duplex (FD) priority of the DL parent link is primary FD, and/or for time-domain resources where the DL child link is correspondingly in time-domain resources whose resource types are DL-Soft or Flexible-Soft.

In block 1350, the network node may determine a set of self-interferences from the DL child link using a set of child beams to the DL parent link using the DL parent beam. The set of child beams may comprise one or more beams for communication between the network node and the child node. In an aspect, means for performing block 1350 may comprise the processing system 334, the memory component 340 and/or the channel estimator 354 of the apparatus 304.

In block 1360, the network node 430 may determine the DL child beam from the set of child beams based on the set of self-interferences. In an aspect, means for performing block 1360 may comprise the processing system 334 and/or the memory component 340 of the apparatus 304.

The child beam whose self-interference from the DL child link using the child beam to the DL parent link using the DL parent beam is at or below a threshold interference (e.g., thermal noise power) may be selected as the DL child beam. Alternatively or in addition thereto, child beam whose self-interference from the DL child link using the child beam to the DL parent link using the DL parent beam is the lowest among the set of child beams may be selected as the DL child beam.

Referring back to FIG. 5, in block 530, the network node may notify the parent node of the DL parent beam for the parent and child time-domain resources. In an aspect, means for performing block 530 may comprise the processing system 334, the memory component 340, and/or the communication device 320 of the apparatus 304.

When the DL parent and child beams are determined in accordance with FIG. 10, the network node may send a beam report to notify the parent node. The beam report may indicate that the beam information included in the beam report is for time-domain resources (e.g., symbols, slots, sub-frames, frames, etc.) where the FD priority of the DL parent link is secondary FD, and/or is for time-domain resources where the DL child link is correspondingly in time-domain resources (e.g., symbols, slots, sub-frames, frames, etc.) whose resource types are DL-Hard or Flexible-Hard.

The beam report may be a channel status indicator (CSI) report that corresponds to a CSI report configuration specified in a CSI report configuration message from the parent node, in which the CSI report configuration message indicates that the corresponding CSI is for time-domain resources where the FD priority of the DL parent link is secondary FD, and/or is for time-domain resources where the DL child link is correspondingly in time-domain resources whose resource types are DL-Hard or Flexible-Hard.

When the DL parent and child beams are determined in accordance with FIG. 11, 12, or 13, the network node may send a beam report to notify the parent node. The beam report may indicate that the beam information included in the beam report is for time-domain resources (e.g., symbols, slots, sub-frames, frames, etc.) where the FD priority of the DL parent link is primary FD, and/or is for time-domain resources (e.g., symbols, slots, sub-frames, frames, etc.) where the DL child link is correspondingly in time-domain resources whose resource types are DL-Soft or Flexible-Soft.

The beam report may be a channel status indicator (CSI) report that corresponds to a CSI report configuration specified in a CSI report configuration message from the parent node, in which the CSI report configuration message indicates that the corresponding CSI is for time-domain resources where the FD priority of the DL parent link is primary FD, and/or is for time-domain resources where the DL child link is correspondingly in time-domain resources whose resource types are DL-Soft or Flexible-Soft. The network node may also report related CRI (CRS Resource Indicator).

In block 540, the network node may concurrently 1) receive from the parent node the parent traffic carried on the parent time-domain resource over the DL parent link using the DL parent beam, and 2) transmit to the child node the child traffic carried on the child time-domain resource over the DL child link using the DL child beam. In an aspect, means for performing block 540 may comprise the processing system 334, the memory component 340, and/or the communication device 320 of the apparatus 304.

Note that each of the DL parent beam and the DL child beam may be characterized by respective transmit power, transmit beamforming direction, and/or receive beamforming direction.

Figure 14:
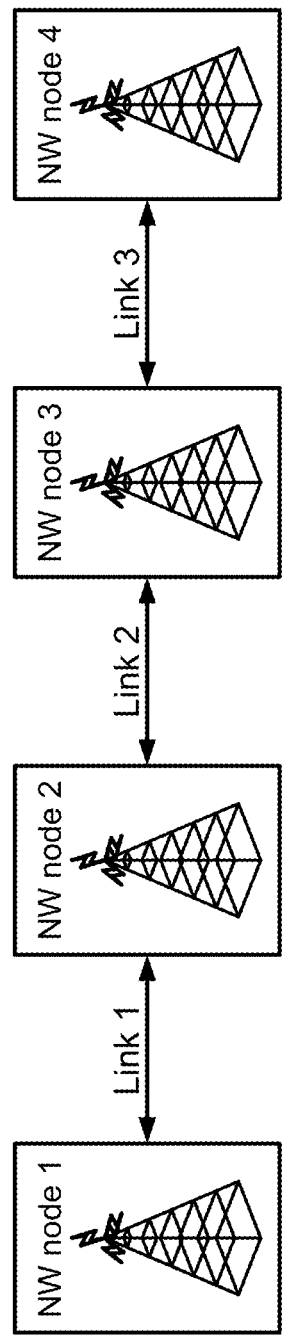
FIG. 14 illustrates an extension of full-duplex communication to multi-hop scenario, according to various aspects.

FIG. 14 illustrates an example extension of FD communication to a multi-hop scenario. FIG. 14 includes network nodes 1-4 connected through links 1-3. Of course, there can be any number of network nodes connected through any number of links. In FIG. 14, all network nodes are assumed to be configured for FD communication. The following list some examples (not necessarily exhaustive) of establishing beams are listed as in scenarios of the links having relative FD link priorities:

Links 1, 2, 3 are configured as FD with priorities from high to low, e.g., network node 2 is configured as P-FD @ link 1 and S-FD @ link 2; network node 3 is configured as P-FD @ link 2 and S-FD @ link 3:
  beam of link 1 may be first determined by network node 1;
  beam of link 2 may be determined second by network node 2, which does not interfere with link 1 with the determined beam;
  beam of link 3 may be determined by network node 3, which does not interfere with link 2 with determined beam.

Links 1, 2, 3 are configured as FD with priorities from low to high, e.g., network node 2 is configured as S-FD @ link 1 and P-FD @ link 2; network node 3 is configured as S-FD @ link 2 and P-FD @ link 3:
  beam of link 3 may be first determined by network node 3;
  beam of link 2 may be determined second by network node 2, which does not interfere with link 3 with determined beam;
  beam of link 1 may be determined by network node 1, which does not interfere with link 2 with determined beam.

Links 1, 3 are configured as P-FD while link 2 is configured as S-FD:
  beam of link 1 and 3 may be first determined by network node 1 and 3, respectively;
  beam of link 2 may be determined by network node 2, which does not interfere with links 1 or 3 with each determined beam.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of a network node configured to communicate with a parent node and a child node, the method comprising:
    determining downlink (DL) parent and child link priorities for parent and child time-domain resources that overlap in time at least partially;
    determining DL parent and child beams based on the DL parent and child link priorities;
    notifying the parent node of the DL parent beam for the parent and child time-domain resources; and
    concurrently receiving parent traffic from the parent node using the DL parent beam and transmitting child traffic to the child node using the DL child beam,
    wherein determining the DL parent and child link priorities comprises:
        determining resource types of the parent and child time-domain resources; and
        determining primary and secondary links based on the resource types of the parent and child time-domain resources, the primary link being one of the DL parent and child links and the secondary link being other of the DL parent and child links, and the primary link having a higher priority than the secondary link.

2. The method of claim 1, wherein the network node is an integrated access backhaul (IAB) node.

3. The method of claim 1,
    wherein the parent time-domain resource comprises any combination of one or more symbols, one or more slots, one or more sub-frames, and one or more frames, and/or
    wherein the child time-domain resource comprises any combination of one or more symbols, one or more slots, one or more sub-frames, and one or more frames.

4. The method of claim 3, wherein determining DL parent and child link priorities comprises:
    determining primary and secondary links, the primary link being one of the DL parent and child links and the secondary link being other of the DL parent and child links, the primary link having a higher priority than the secondary link.

5. The method of claim 4, wherein the DL parent link for the parent time-domain resource is preconfigured to be one of the primary and secondary links, and the DL child link for the child time-domain resource is preconfigured to be other of the primary and secondary links.

6. The method of claim 5, wherein the DL parent and child links for the parent and child time-domain resources are preconfigured by an upstream node of the network node.

7. The method of claim 5,
wherein a full-duplex (FD) priority of the DL parent link for the parent time-domain resource is preconfigured to be one of primary FD and secondary FD,
wherein a full-duplex (FD) priority of the DL child link for the child time-domain resource is preconfigured to be one of primary FD and secondary FD,
wherein for the DL parent link,
  primary FD indicates that the DL parent link is the primary link and the DL child link is the secondary link, and
  secondary FD indicates that the DL parent link is the secondary link and the DL child link is the primary link,
wherein for the DL child link,
  primary FD indicates that the DL child link is the primary link and the DL parent link is the secondary link, and
  secondary FD indicates that the DL child link is the secondary link and the DL parent link is the primary link, and
wherein the DL parent link and the DL child link are not both primary links simultaneously and also are not both secondary links simultaneously.

8. The method of claim 1,
wherein the resource type of the parent time-domain resource is DL, UL, or Flexible (F), and the resource type of the child time-domain resource is DL-Hard, DL-Soft, UL-Hard, UL-Soft, Flexible-Hard, or Flexible-Soft,
wherein for the parent time-domain resource,
  DL indicates that the parent time-domain resource is available for traffic from the parent node to the network node,
  UL indicates that the parent time-domain resource is available for traffic from the network node to the parent node, and
  Flexible indicates that the parent time-domain resource is available for traffic in either direction between the network node and the parent node, and
wherein for the child time-domain resource,
  DL-Hard indicates that the child time-domain resource is always available for traffic from the network node to the child node,
  DL-Soft indicates that the availability of the child time-domain resource for traffic from the network node to the child node is controlled by an upstream node,
  UL-Hard indicates that the child time-domain resource is always available for traffic from the child node to the network node,
  DL-Soft indicates that the availability of the child time-domain resource for traffic from the child node to the network node is controlled by an upstream node,
  Flexible-Hard indicates that the child time-domain resource is always available for traffic in either direction between the network node and the child node, and
  Flexible-Soft indicates that the availability of the child time-domain resource in either direction between the network node and the child node is controlled by an upstream node.

9. The method of claim 8, further comprising:
determining whether downlink full-duplex (DL FD) communication is possible based on the resource types of the parent and child time-domain resources,
wherein the primary and secondary links are determined when it is determined that the DL FD communication is possible.

10. The method of claim 9, wherein the DL FD communication is determined to be possible when the resource type of the parent time-domain resource is one of DL and F and the and the resource type of the child time-domain resource is one of DL-Hard, DL-Soft, Flexible-Hard, and Flexible-Soft.

11. The method of claim 1, wherein determining the primary and secondary links comprises:
setting the DL child link as one of the primary and secondary links and the DL parent link as other one of the primary and secondary links; and
notifying the parent node of the primary and/or secondary link settings.

12. The method of claim 1, wherein determining the primary and secondary links comprises:
determining an availability property of the child time-domain resource;
when the availability property of the child time-domain resource is Hard indicating that the child time-domain resource is always available for the DL child link,
  setting the DL child link as one of the primary and secondary links, and
  notifying the parent node of the DL child link setting; and
when the availability property of the child time-domain resource is Soft indicating that the availability of the child time-domain resource the DL child link is controlled by an upstream node,
  receiving a notification from the parent node indicating that the DL parent link is set to one of the primary and secondary links, and
  setting that the DL child link as other of the primary and secondary links.

13. The method of claim 1, wherein determining the primary and secondary links comprises:
determining an availability property of the child time-domain resource;
when the availability property of the child time-domain resource is Hard indicating that the child time-domain resource is always available for the DL child link, setting the DL child link as the primary link and the DL parent link as the secondary link;
when the availability property of the child time-domain resource is Soft indicating that the availability of the child time-domain resource the DL child link is controlled by an upstream node, setting the DL child link as the secondary link and the DL parent link as the primary link; and
notifying the parent node of the primary and/or secondary link settings.

14. The method of claim 1, wherein when the primary link is the DL child link, determining the DL parent and child beams comprises:
determining the DL child beam;
measuring a DL reference signal (RS) from the parent node received over the DL parent link;

determining the self-interference from the DL child link to the DL parent link based on the measurement and in consideration of the DL child beam; and determining the DL parent beam based on the self-interference.

15. The method of claim 14, wherein determining the DL beam comprises:

selecting a parent beam from a set of parent beams as the DL parent beam, the set of parent beams comprising one or more beams for communication between the network node and the parent node, the DL parent beam being the parent beam whose beamforming gain divided by the determined self-interference strength is the largest among the set of parent beams.

16. The method of claim 14, wherein the notifying the parent node of the DL parent beam for the parent and child time-domain resources comprises:

sending a beam report to the parent node indicating that that a beam information included in the beam report is for time-domain resources where a full-duplex (FD) priority of the DL parent link is secondary FD, and/or for time-domain resources where the DL child link is correspondingly in time-domain resources whose resource types are DL-Hard or Flexible-Hard, wherein for the DL parent link, secondary FD priority indicates that the DL parent link is the secondary link and the DL child link is the primary link, and wherein for the DL child link, DL-Hard indicates that the time-domain resource is always available for traffic from the network node to the child node.

17. The method of claim 16, wherein the DL RS is a CSI-RS, and wherein the beam report is a channel status indicator (CSI) report that corresponds to a CSI report configuration specified in a CSI report configuration message from the parent node, the CSI report configuration message indicating that the corresponding CSI is for time-domain resources where a full-duplex (FD) priority of the DL parent link is secondary FD, and/or for time-domain resources where the DL child link is correspondingly in time-domain resources whose resource types are DL-Hard or Flexible-Hard.

18. The method of claim 1, wherein when the primary link is the DL parent link, determining the DL parent and child beams comprises:

receiving a notification from the parent node about a determination of the DL parent beam;

determining a set of self-interferences from the DL child link using a set of child beams to the DL parent link using the DL parent beam, the set of child beams comprising one or more beams for communication between the network node and the child node; and determining the DL child beam from the set of child beams based on the set of self-interferences.

19. The method of claim 18, wherein receiving the notification from the parent node comprises:

receiving a message and/or a DL reference signal (RS) from the parent node over the DL parent link using the DL parent beam, the message indicating that that a full-duplex (FD) priority associated with the DL RS or the DL parent beam is primary FD.

20. The method of claim 19, wherein the DL RS is a CSI-RS, and wherein parent node identifies to the network node a CSI-RS resource to indicate that the CSI-RS sent at the CSI-RS resource uses the DL parent beam for the DL parent link for time-domain resources where a full-duplex (FD) priority of the DL parent link is primary FD, and/or for time-domain resources where the DL child link is correspondingly in time-domain resources whose resource types are DL-Soft or Flexible-Soft.

21. The method of claim 18, wherein determining the DL child beam comprises:

selecting a child beam from the set of child beams as the DL child beam, the DL child beam being the child beam whose self-interference from the DL child link using the child beam to the DL parent link using the DL parent beam is at or below a threshold interference.

22. The method of claim 18, wherein determining the DL child beam comprises:

selecting a child beam from the set of child beams as the DL child beam, the DL child beam being the child beam whose self-interference from the DL child link using the child beam to the DL parent link using the DL parent beam the lowest among the set of child beams.

23. The method of claim 18, wherein the notifying the parent node of the DL parent beam for the parent and child time-domain resources comprises:

sending a beam report to the parent node indicating that that a beam information included in the beam report is for time-domain resources where a full-duplex (FD) priority of the DL parent link is primary FD, and/or for time-domain resources where the DL child link is correspondingly in time-domain resources whose resource types are DL-Soft or Flexible-Soft, wherein for the DL parent link, primary FD priority indicates that the DL parent link is the primary link and the DL child link is the secondary link, and wherein for the DL child link, DL-soft indicates that the availability of the time-domain resources is controlled by an upstream node.

24. The method of claim 23, wherein the beam report is a channel status indicator (CSI) report that corresponds to a CSI report configuration specified in a CSI report configuration message from the parent node, the CSI report configuration message indicating that the corresponding CSI is for time-domain resources where a full-duplex (FD) priority of the DL parent link is primary FD, and/or for time-domain resources where the DL child link is correspondingly in time-domain resources whose resource types are DL-Soft or Flexible-Soft.

25. The method of claim 24, wherein the network node also reports related CRI (CRS Resource Indicator).

26. The method of claim 1, wherein when the primary link is the DL parent link, determining the DL parent and child beams comprises:

receiving a plurality of DL reference signals (RS) from the parent node over the DL parent link using a plurality of parent beams, each parent beam being a beam for communication between the network node and the parent node;

determining the DL parent beam out of the plurality of parent beams based on the receiving;

determining a plurality of self-interferences from the DL child link using a plurality of child beams to the DL parent link using the DL parent beam, each child beam being a beam for communication between the network node and the child node; and determining the DL child beam from the plurality of child beams based on the plurality of self-interferences.

27. The method of claim 26, wherein determining the DL child beam comprises:

selecting a child beam from the plurality of child beams as the DL child beam, the DL child beam being the child beam whose self-interference from the DL child link using the child beam to the DL parent link using the DL parent beam is at or below a threshold interference.

28. The method of claim 26, wherein determining the DL child beam comprises:
selecting a child beam from the plurality of child beams as the DL child beam, the DL child beam being the child beam whose self-interference from the DL child link using the child beam to the DL parent link using the DL parent beam is the lowest among the plurality of child beams.

29. The method of claim 26, wherein the notifying the parent node of the DL parent beam for the parent and child time-domain resources comprises:
sending a beam report to the parent node indicating that that a beam information included in the beam report is for time-domain resources where a full-duplex (FD) priority of the DL parent link is primary FD, and/or for time-domain resources where the DL child link is correspondingly in time-domain resources whose resource types are DL-Soft or Flexible-Soft,
wherein for the DL parent link, primary FD priority indicates that the DL parent link is the primary link and the DL child link is the secondary link, and
wherein for the DL child link, DL-soft indicates that the availability of the time-domain resources are controlled by an upstream node.

30. The method of claim 29, wherein the beam report is a channel status indicator (CSI) report that corresponds to a CSI report configuration specified in a CSI report configuration message from the parent node, the CSI report configuration message indicating that the corresponding CSI is for time-domain resources where a full-duplex (FD) priority of the DL parent link is primary FD, and/or for time-domain resources where the DL child link is correspondingly in time-domain resources whose resource types are DL-Soft or Flexible-Soft.

31. The method of claim 1, wherein when the primary link is the DL parent link, determining the DL parent and child beams comprises:
receiving a plurality of DL reference signals (RS) from the parent node over the DL parent link using a plurality of parent beams, each parent beam being a beam for communication between the network node and the parent node;
selecting a set of parent beams based on the plurality of DL RSs, the set of parent beams comprising one or more parent beams of the plurality of parent beams;
notifying the parent node about the selecting;
receiving a notification from the parent node about a determination of the DL parent beam, the DL parent beam being a parent beam of the set of parent beams;
determining a set of self-interferences from the DL child link using a set of child beams to the DL parent link using the DL parent beam, the set of child beams comprising one or more beams for communication between the network node and the child node; and
determining the DL child beam from the set of child beams based on the set of self-interferences.

32. The method of claim 31, wherein selecting the set of parent beams comprises including in the set of parent beams one or more parent beams whose signal-to-noise ratio (SNR) and/or signal-to-interference-and-noise ratio (SINR) of the corresponding DL RS is at or above a threshold SNR and/or threshold SINR.

33. The method of claim 31, wherein receiving the notification from the parent node comprises:
receiving a message and/or a DL reference signal (RS) from the parent node over the DL parent link using the DL parent beam, the message indicating that that a full-duplex (FD) priority associated with the DL RS or the DL parent beam is primary FD.

34. The method of claim 33,
wherein the DL RS is a CSI-RS, and
wherein parent node identifies to the network node a CSI-RS resource to indicate that the CSI-RS sent at the CSI-RS resource uses the DL parent beam for the DL parent link for time-domain resources where a full-duplex (FD) priority of the DL parent link is primary FD, and/or for time-domain resources where the DL child link is correspondingly in time-domain resources whose resource types are DL-Soft or Flexible-Soft.

35. The method of claim 31, wherein determining the DL child beam comprises:
selecting a child beam from the set of child beams as the DL child beam, the DL child beam being the child beam whose self-interference from the DL child link using the child beam to the DL parent link using the DL parent beam is at or below a threshold interference.

36. The method of claim 31, wherein determining the DL child beam comprises:
selecting a child beam from the set of child beams as the DL child beam, the DL child beam being the child beam whose self-interference from the DL child link using the child beam to the DL parent link using the DL parent beam is the lowest among the set of child beams.

37. The method of claim 31, wherein the notifying the parent node of the DL parent beam for the parent and child time-domain resources comprises:
sending a beam report to the parent node indicating that that a beam information included in the beam report is for time-domain resources where a full-duplex (FD) priority of the DL parent link is primary FD, and/or for time-domain resources where the DL child link is correspondingly in time-domain resources whose resource types are DL-Soft or Flexible-Soft,
wherein for the DL parent link, primary FD priority indicates that the DL parent link is the primary link and the DL child link is the secondary link, and
wherein for the DL child link, DL-soft indicates that the availability of the time-domain resources are controlled by an upstream node.

38. The method of claim 37, wherein the beam report is a channel status indicator (CSI) report that corresponds to a CSI report configuration specified in a CSI report configuration message from the parent node, the CSI report configuration message indicating that the corresponding CSI is for time-domain resources where a full-duplex (FD) priority of the DL parent link is primary FD, and/or for time-domain resources where the DL child link is correspondingly in time-domain resources whose resource types are DL-Soft or Flexible-Soft.

39. The method of claim 1,
wherein the DL parent beam is characterized by its transmit power, transmit beamforming direction, and/or receive beamforming direction, and
wherein the DL child beam is characterized by its transmit power, transmit beamforming direction, and/or receive beamforming direction.

40. A network node configured to communicate with a parent node and a child node, the network node comprising:
a transceiver;
a memory; and
a processor communicatively coupled to the transceiver and the memory,
wherein the processor, the transceiver, and the memory are configured to:
determine downlink (DL) parent and child link priorities for parent and child time-domain resources that overlap in time at least partially;
determine DL parent and child beams based on the DL parent and child link priorities;
notify the parent node of the DL parent beam for the parent and child time-domain resources; and
concurrently receive parent traffic from the parent node using the DL parent beam and transmit child traffic to the child node using the DL child beam, and
wherein in determining the DL parent and child link priorities, the processor, the transceiver, and the memory are configured to:
determine resource types of the parent and child time-domain resources; and
determine primary and secondary links based on the resource types of the parent and child time-domain resources, the primary link being one of the DL parent and child links and the secondary link being other of the DL parent and child links, and the primary link having a higher priority than the secondary link.

41. A network node for communicating with a parent node and a child node, the network node comprising:
means for determining downlink (DL) parent and child link priorities for parent and child time-domain resources that overlap in time at least partially;
means for determining DL parent and child beams based on the DL parent and child link priorities;
means for notifying the parent node of the DL parent beam for the parent and child time-domain resources; and
means for concurrently receiving parent traffic from the parent node using the DL parent beam and transmitting child traffic to the child node using the DL child beam,
wherein the means for determining the DL parent and child link priorities comprises:
means for determining resource types of the parent and child time-domain resources; and
means for determining primary and secondary links based on the resource types of the parent and child time-domain resources, the primary link being one of the DL parent and child links and the secondary link being other of the DL parent and child links, and the primary link having a higher priority than the secondary link.

42. A non-transitory computer-readable medium storing computer-executable instructions for a network node to communicate with a parent node and a child node, the computer-executable instructions comprising:
one or more instructions causing the network node to determine downlink (DL) parent and child link priorities for parent and child time-domain resources that overlap in time at least partially;
one or more instructions causing the network node to determine DL parent and child beams based on the DL parent and child link priorities;
one or more instructions causing the network node to notify the parent node of the DL parent beam for the parent and child time-domain resources; and
one or more instructions causing the network node to concurrently receive parent traffic from the parent node using the DL parent beam and transmit child traffic to the child node using the DL child beam,
wherein the one or more instructions causing the network node to determine the DL parent and child link priorities cause the network node to:
determine resource types of the parent and child time-domain resources; and
determine primary and secondary links based on the resource types of the parent and child time-domain resources, the primary link being one of the DL parent and child links and the secondary link being other of the DL parent and child links, and the primary link having a higher priority than the secondary link.

* * * * *